S. A. MAXWELL.
MAILING MACHINE.
APPLICATION FILED OCT. 17, 1902. RENEWED JUNE 25, 1908.
992,225.
Patented May 16, 1911.
14 SHEETS—SHEET 7.
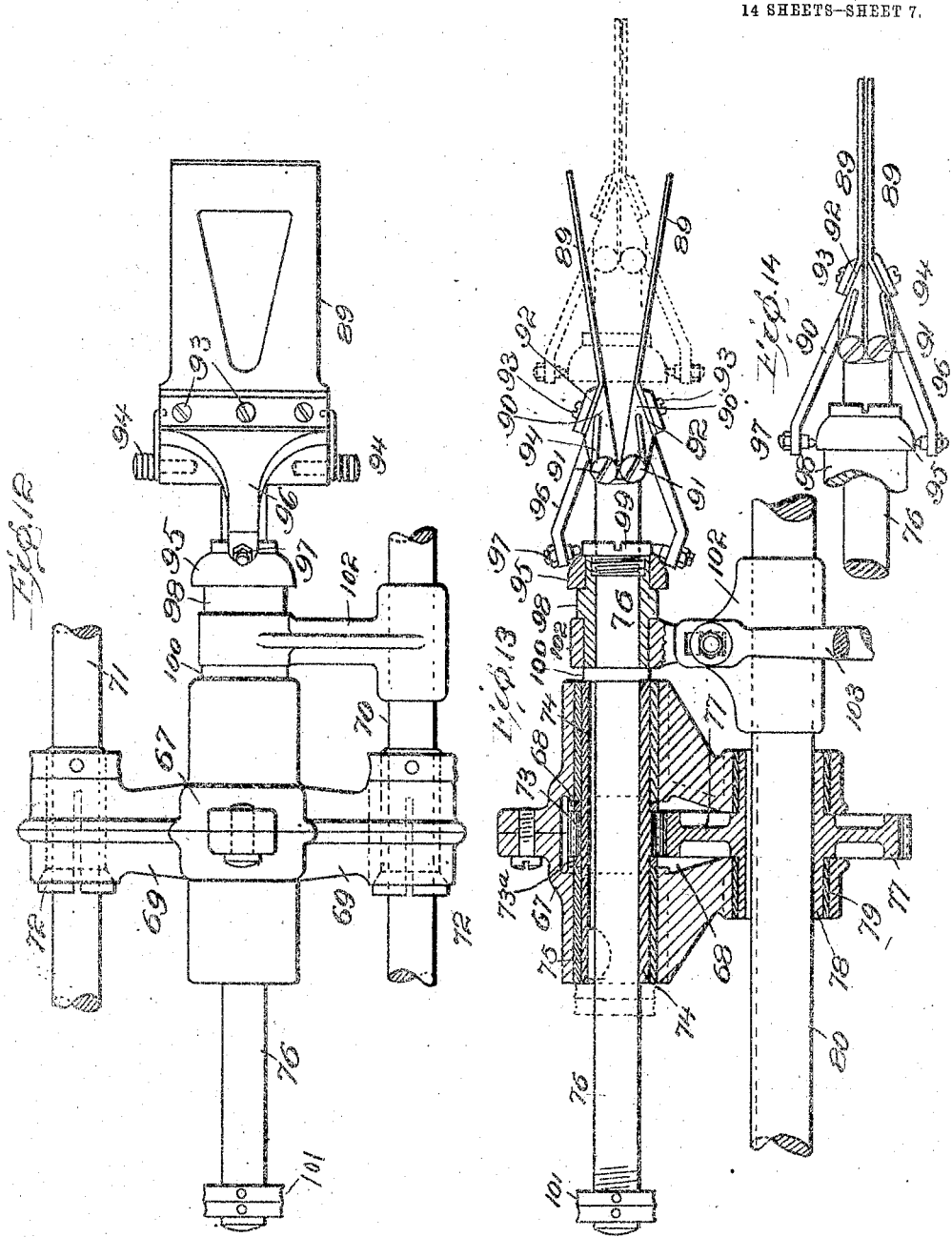
WITNESSES:
INVENTOR
ATTORNEY

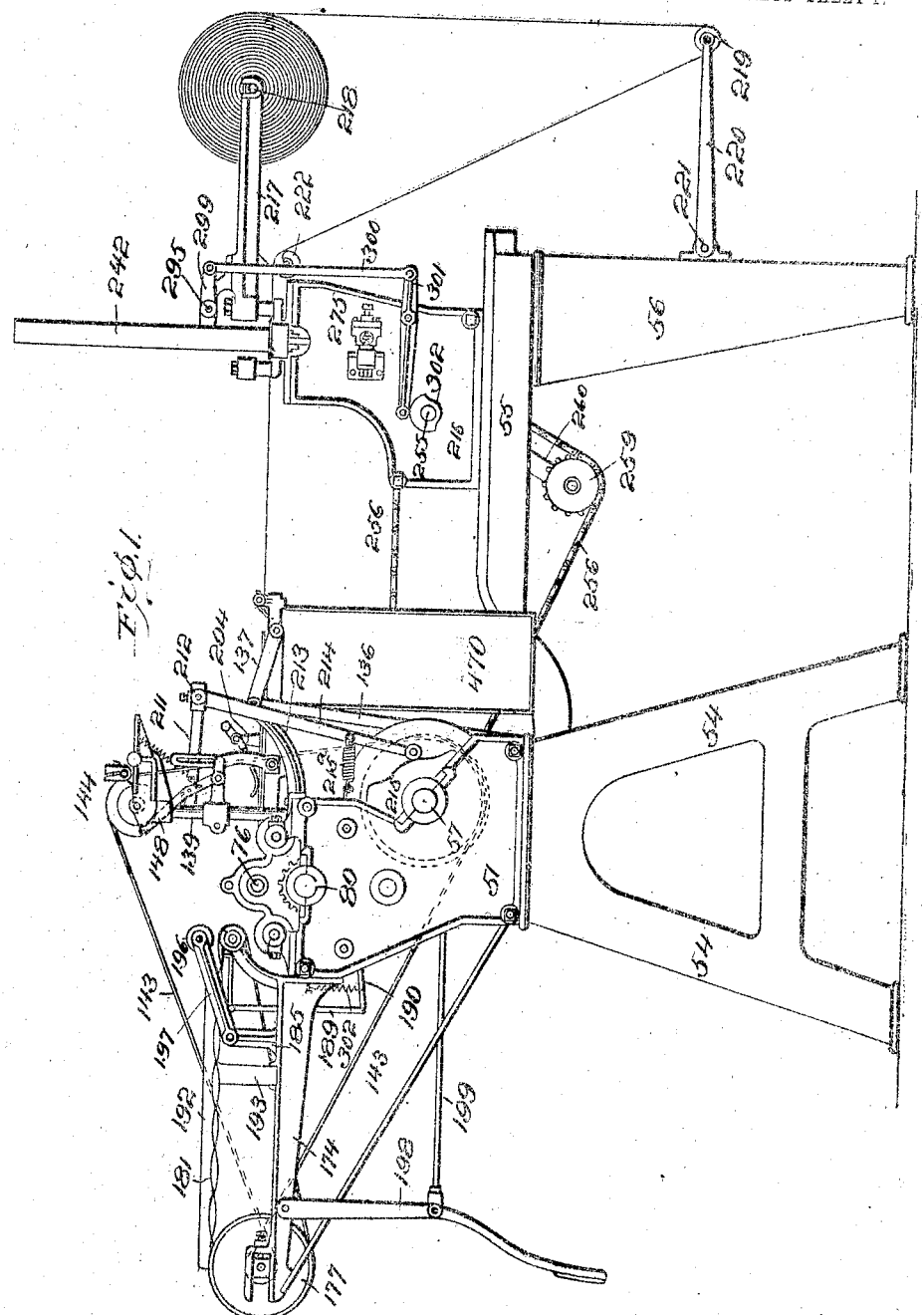

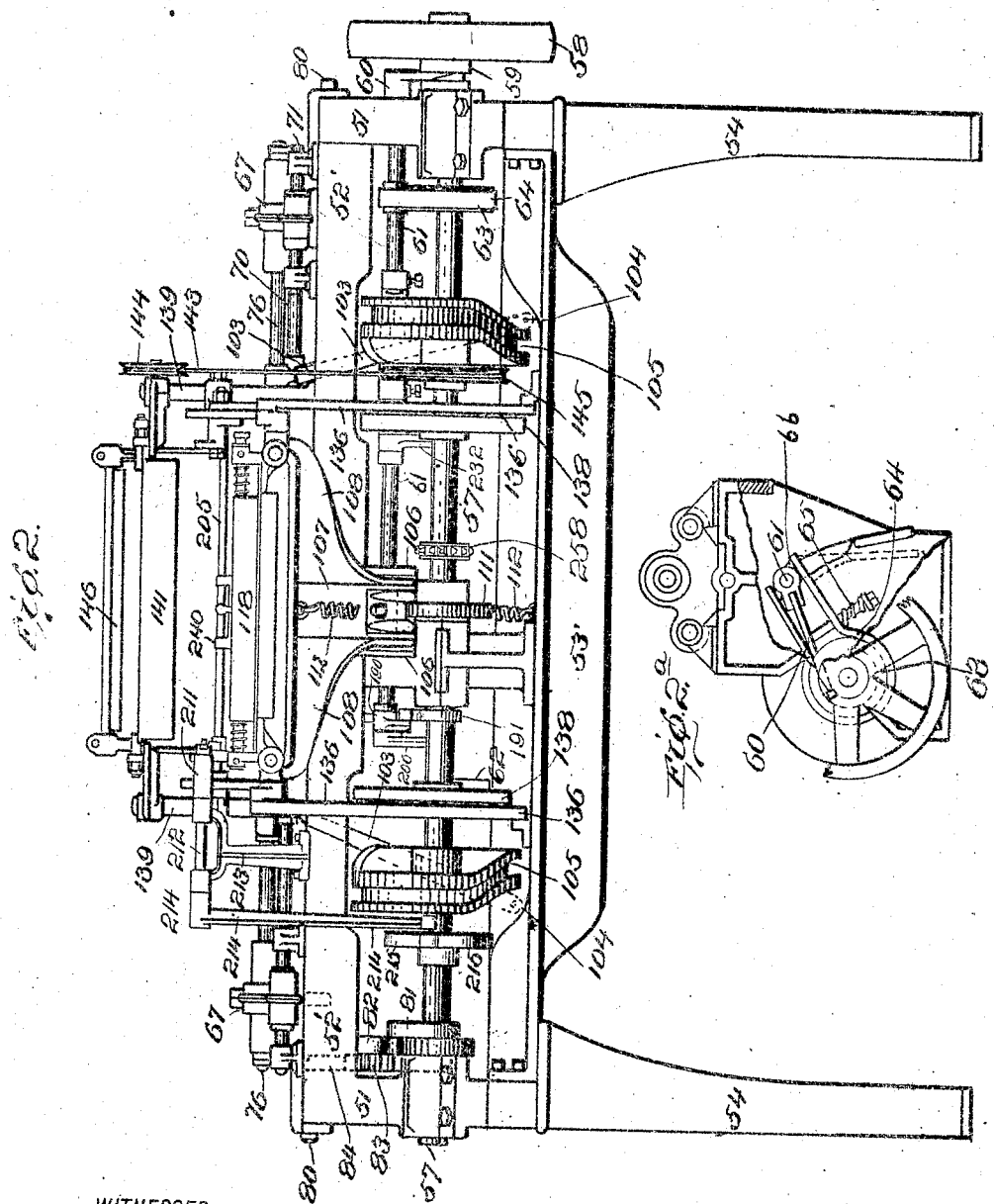

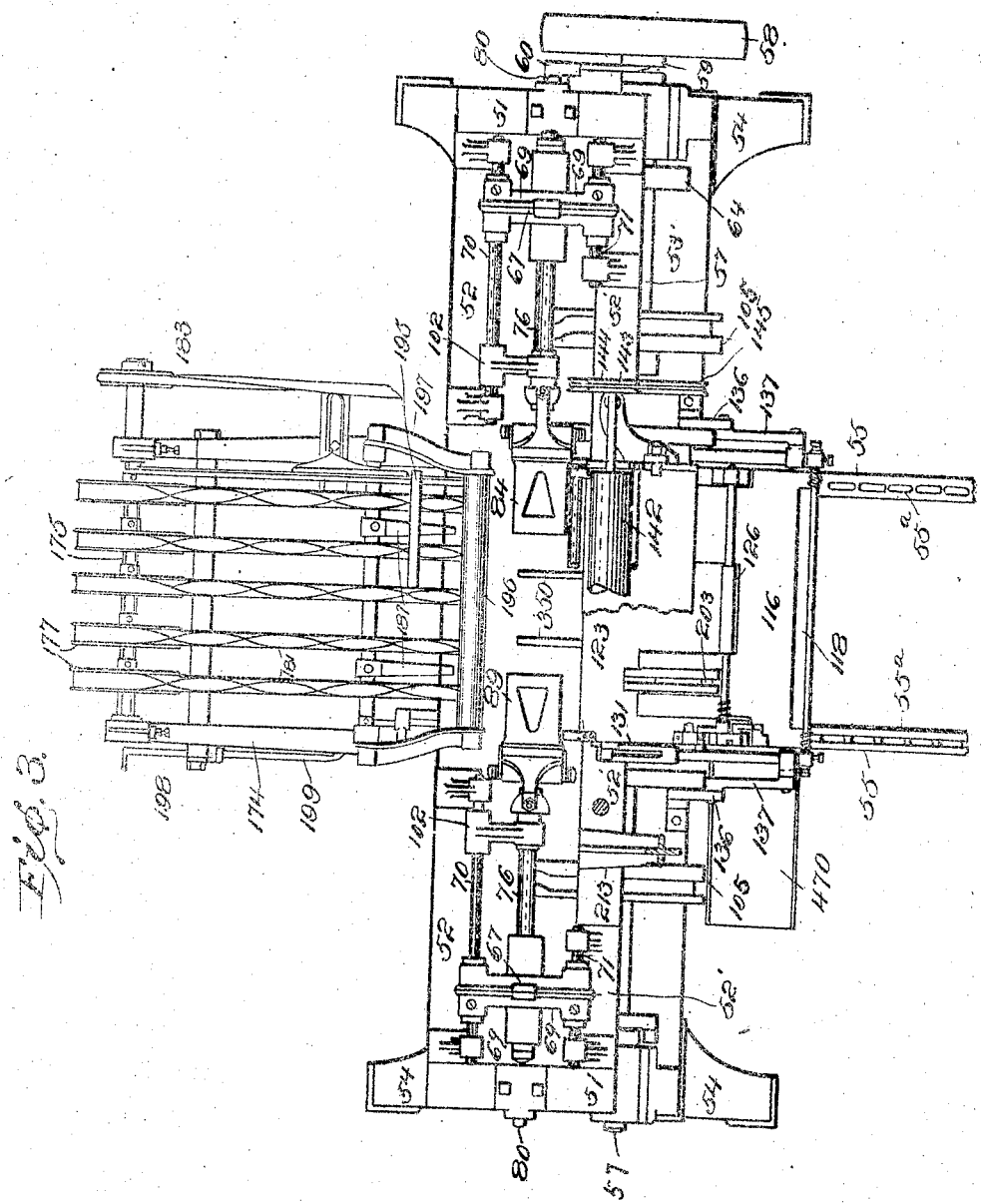

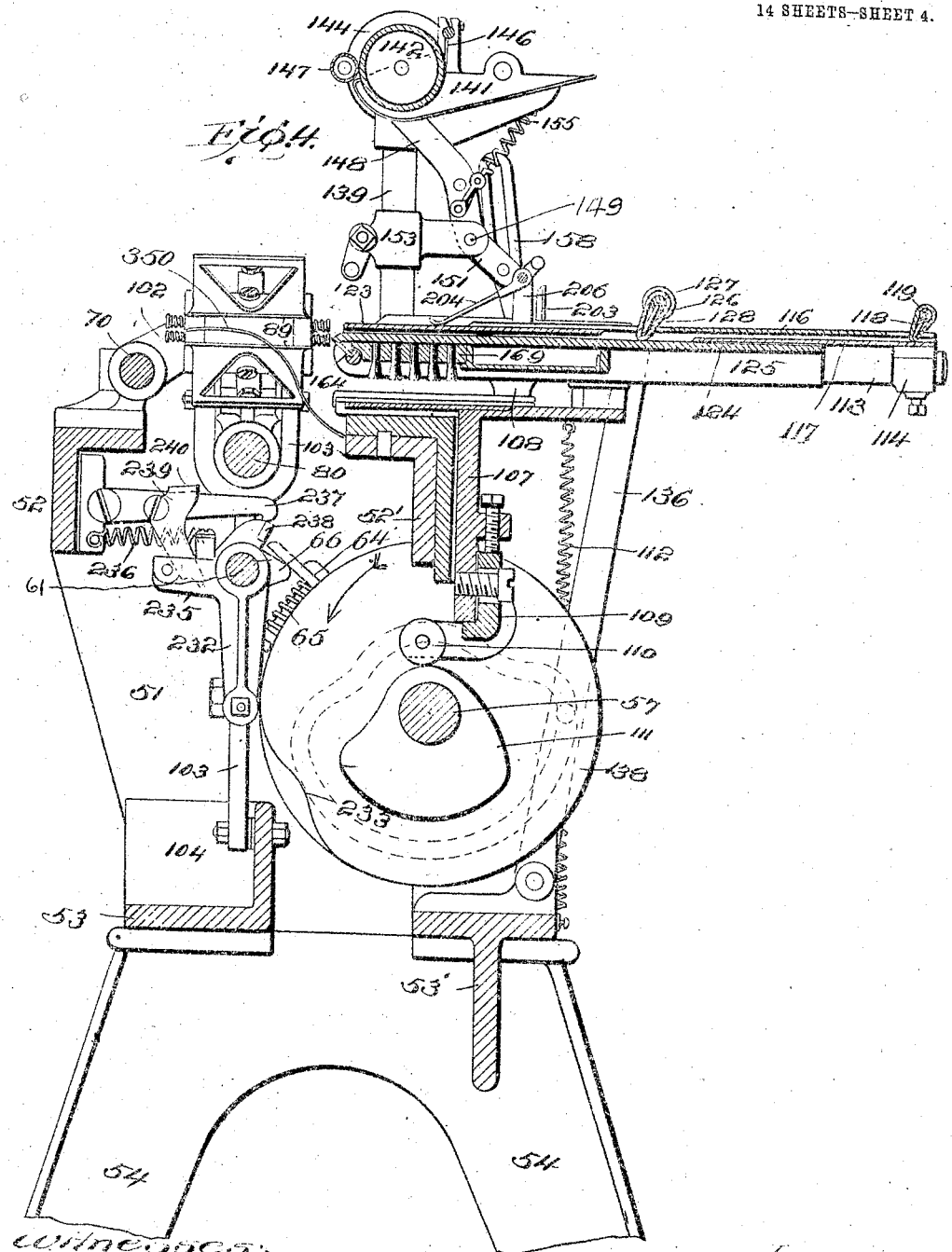

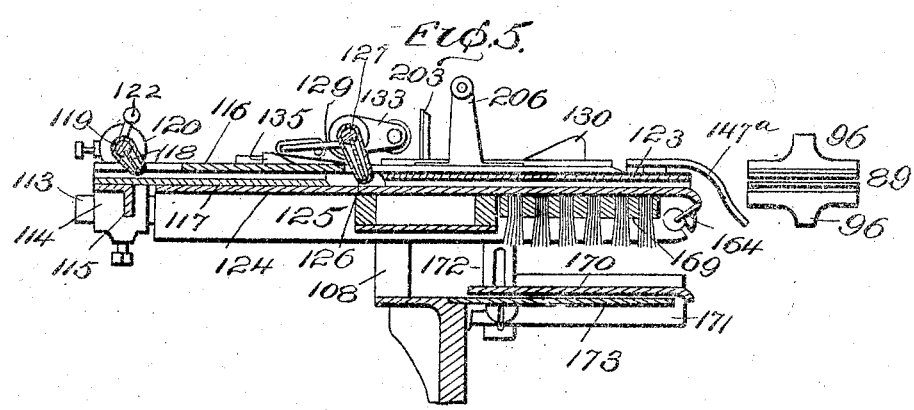
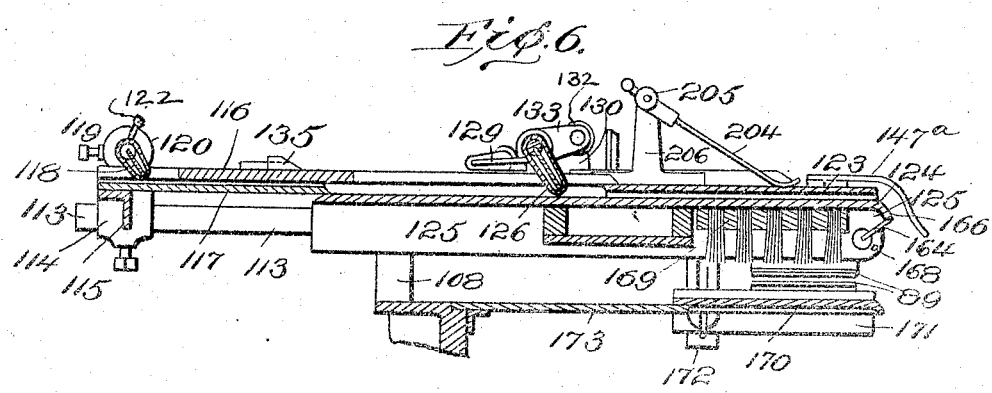

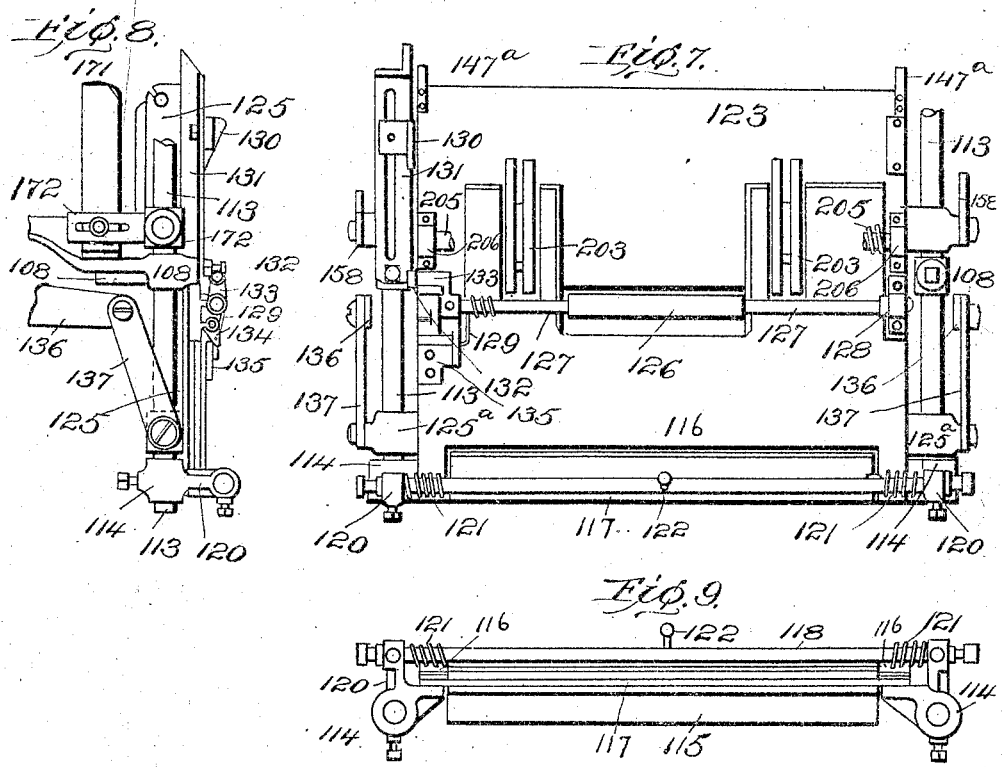
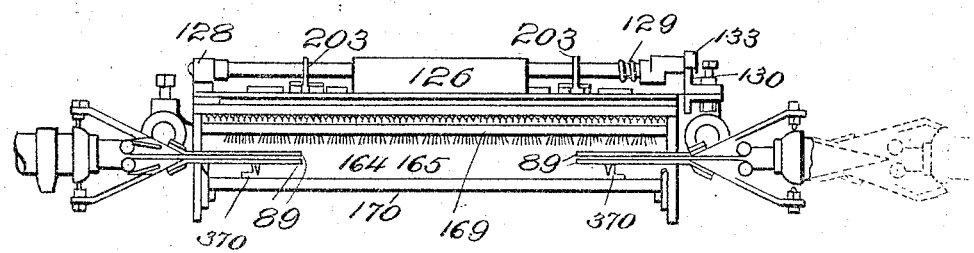

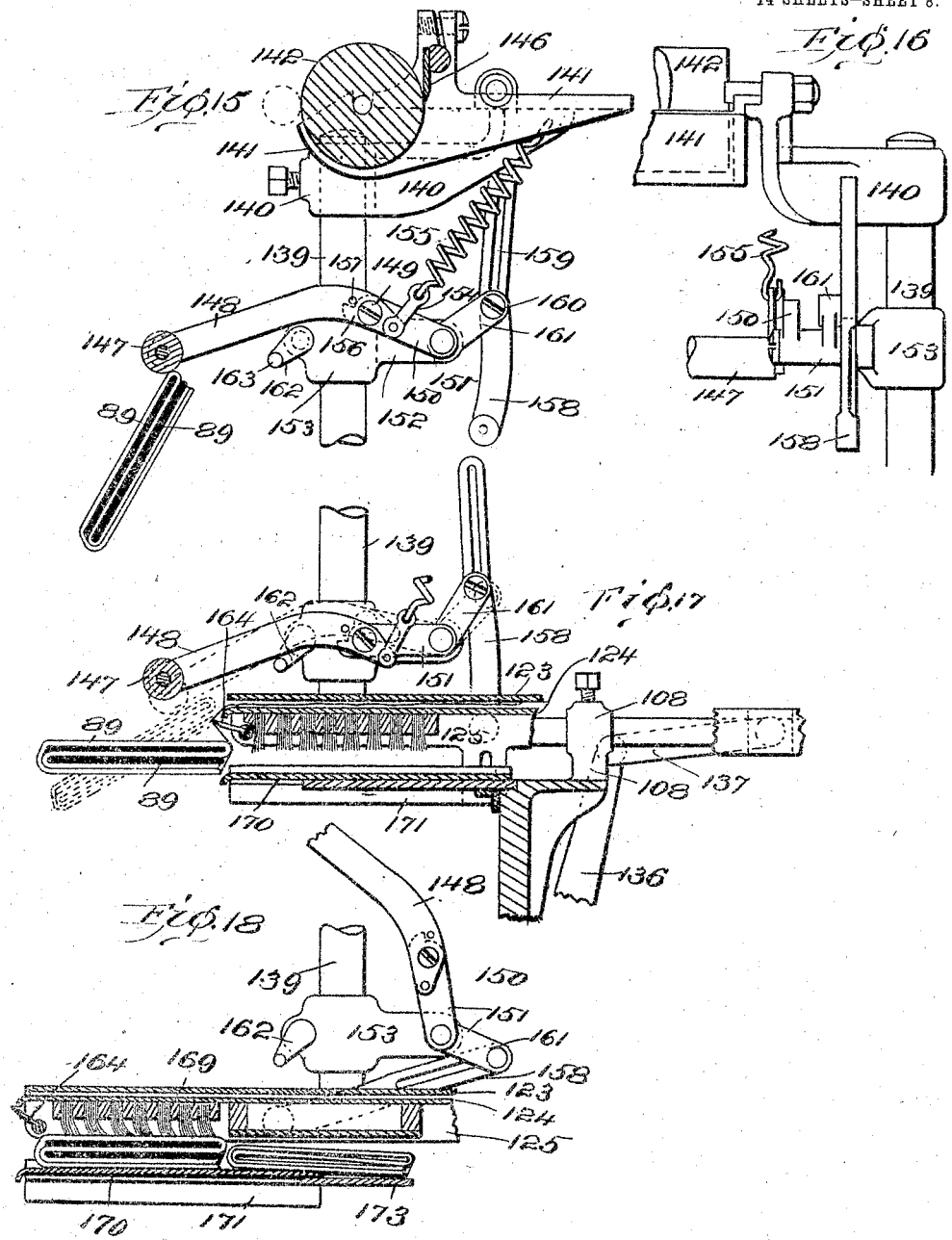

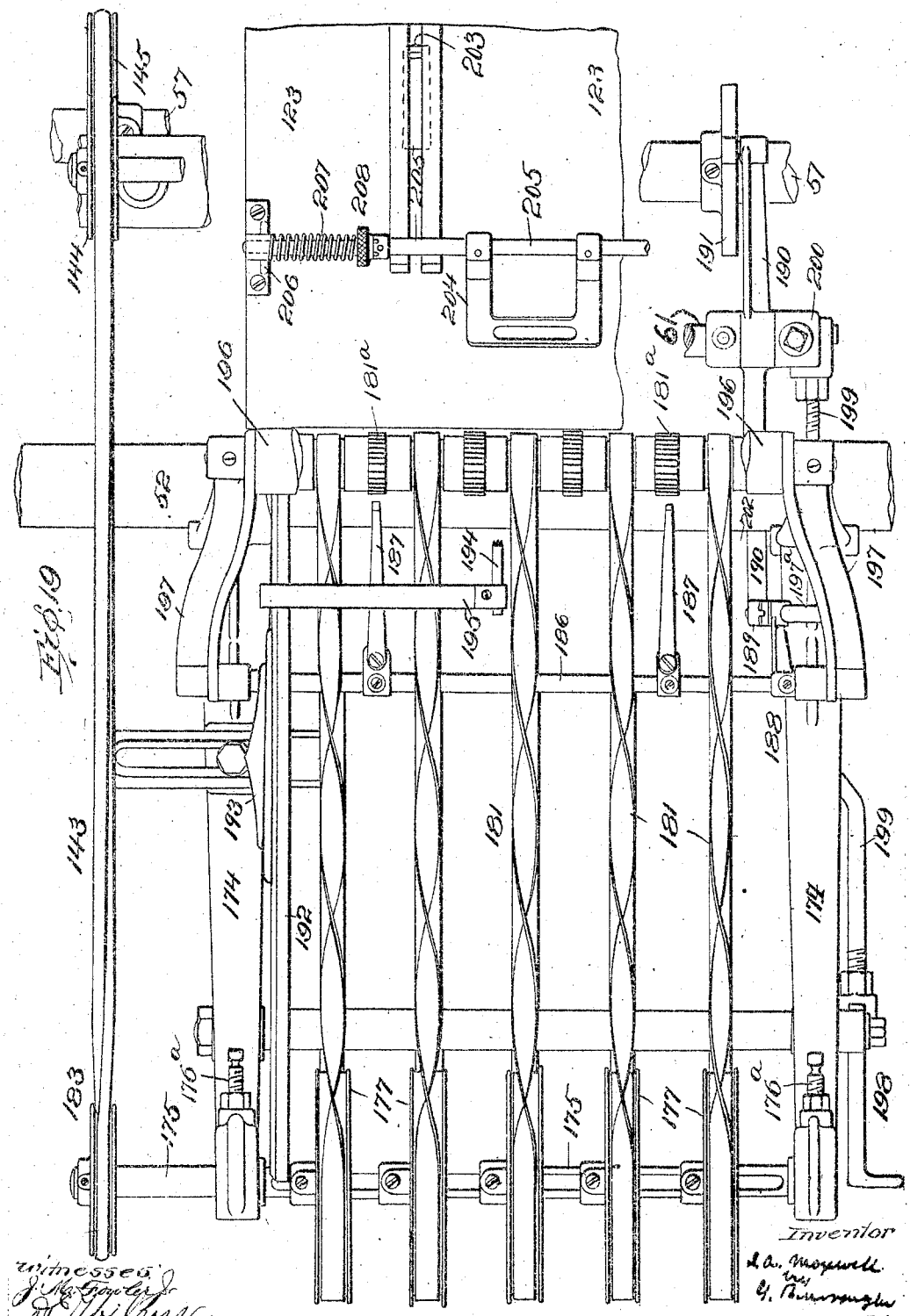

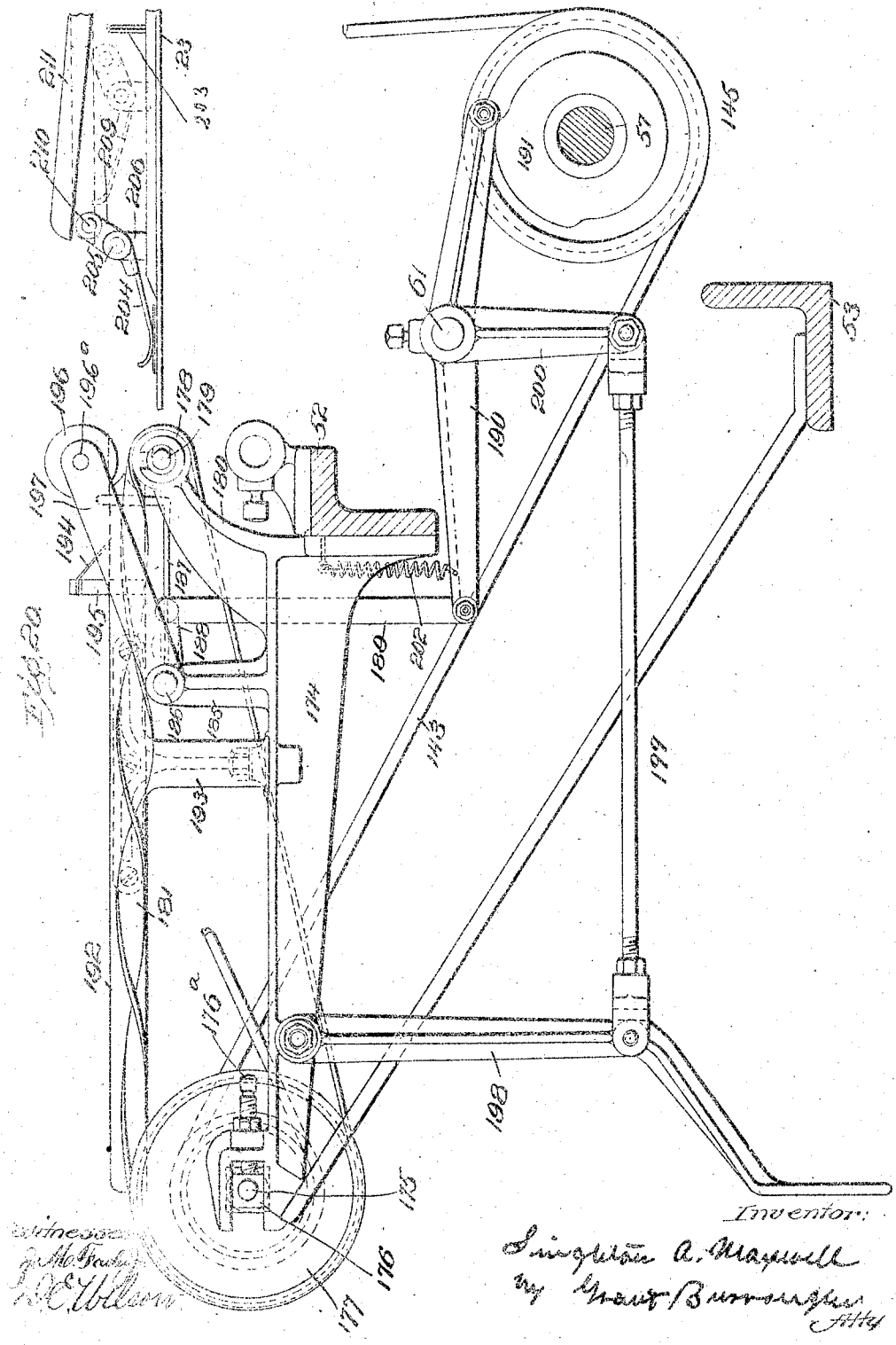

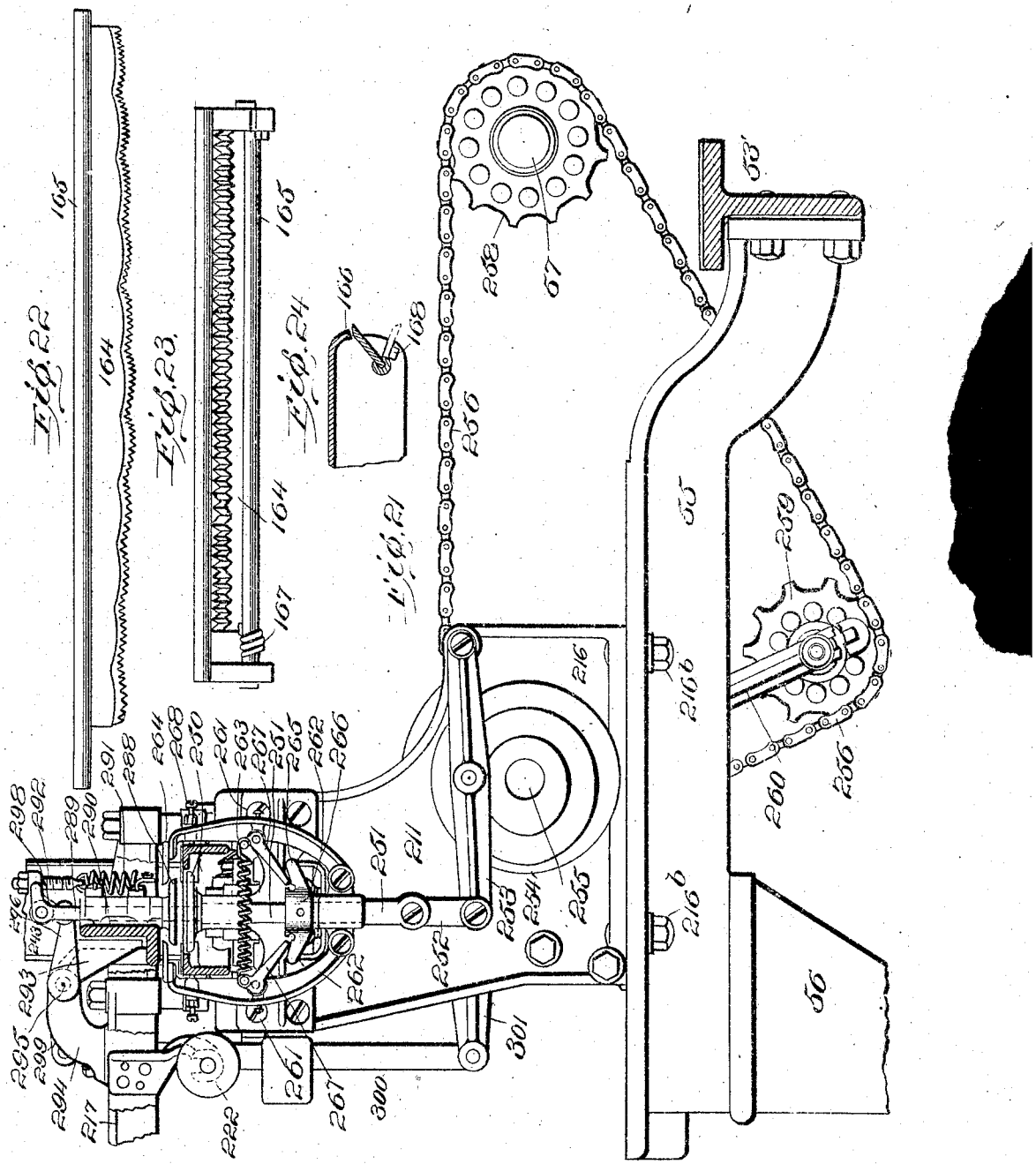

S. A. MAXWELL.
MAILING MACHINE.
APPLICATION FILED OCT. 17, 1902. RENEWED JUNE 25, 1908.
992,225.
Patented May 16, 1911.
14 SHEETS—SHEET 12.
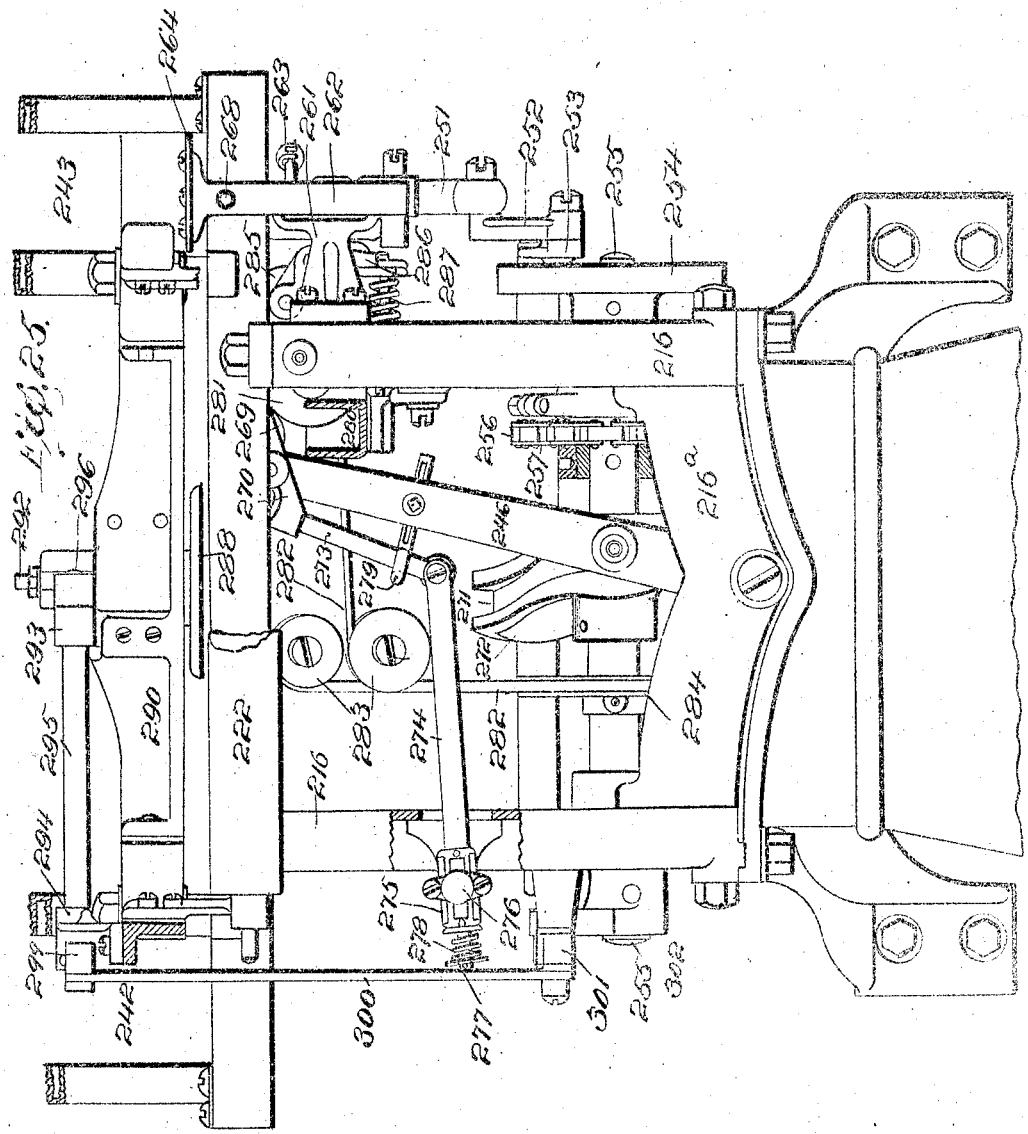

S. A. MAXWELL.
MAILING MACHINE.
APPLICATION FILED OCT. 17, 1902. RENEWED JUNE 25, 1908.
992,225.
Patented May 16, 1911.
14 SHEETS—SHEET 13.
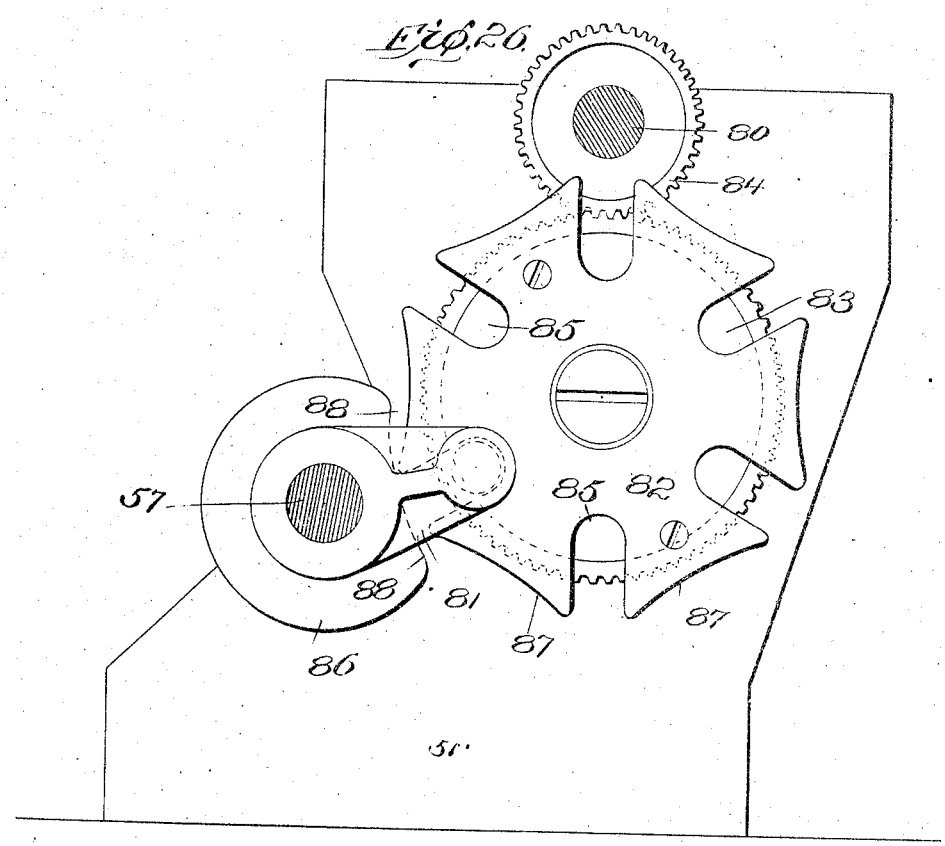
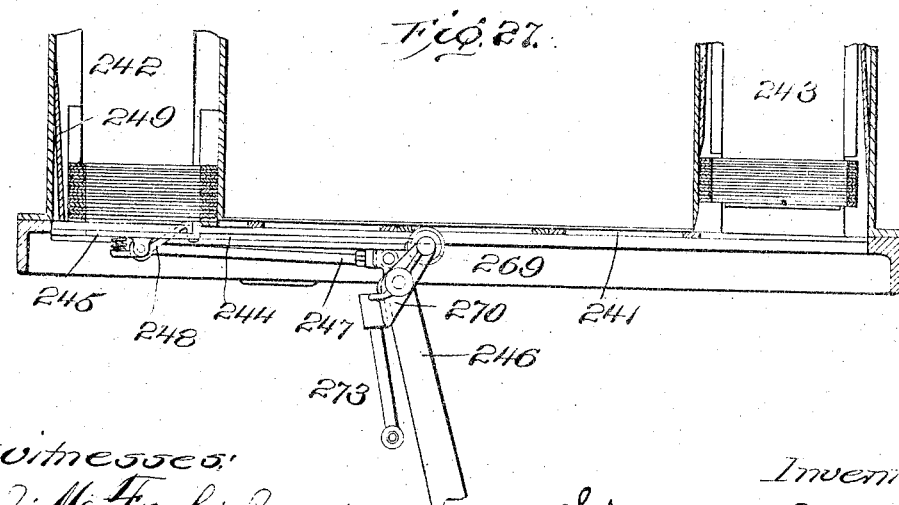

S. A. MAXWELL.
MAILING MACHINE.
APPLICATION FILED OCT. 17, 1902. RENEWED JUNE 25, 1908.
992,225.
Patented May 16, 1911.
14 SHEETS—SHEET 14.
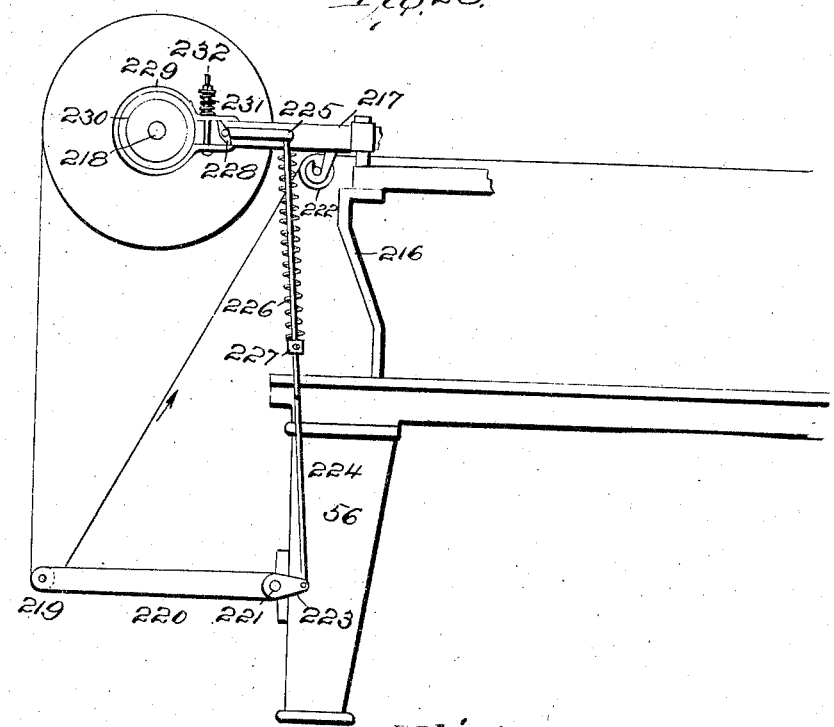
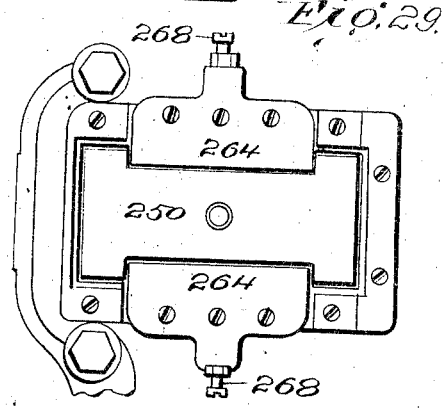

UNITED STATES PATENT OFFICE.

SINGLETON A. MAXWELL, OF ATLANTA, GEORGIA, ASSIGNOR, BY MESNE ASSIGNMENTS, TO THE MAXWELL AUTOMATIC FOLDING, WRAPPING & ADDRESSING MACHINE COMPANY, OF AUGUSTA, MAINE, A CORPORATION OF MAINE.

MAILING-MACHINE.

992,225.  Specification of Letters Patent.  Patented May 16, 1911.

Application filed October 17, 1902, Serial No. 127,661. Renewed June 25, 1908. Serial No. 440,359.

*To all whom it may concern:*

Be it known that I, SINGLETON A. MAXWELL, a citizen of the United States, and resident of Atlanta, in the county of Fulton and State of Georgia, have invented certain new and useful Improvements in Mailing-Machines, of which the following is a full, clear, and exact description, such as will enable those skilled in the art to which it appertains to make and use the same, reference being had to the accompanying drawings, forming a part of this specification.

This invention relates to mailing machines of that description in which the parcel is formed and addressed preparatory to mailing.

It relates more particularly to that class of machines in which the article, such as a newspaper, and its jacket are folded and wrapped together.

In machines of this class, as heretofore constructed, the jackets have been supplied to the parcel forming mechanism in the form of a single sheet of paper for each wrapper. Such machines have been found to be of slow operation and their output consequently limited owing to the difficulty in manipulating the single sheets during the process of forming the parcel. Furthermore, where the parcel forming mechanism consists of rotatable grippers, it has been found necessary to employ a wiper, or a similar device, to coöperate with the grippers in applying the jacket. This has been found objectionable as when the machine is run at a high rate of speed the wiper is apt to injure the jacket or wrapper; this is especially so when the jacket is applied to a flat article such as a folded newspaper. Also, in these prior machines the address is placed on the single sheets before the latter are applied as wrappers, or it is affixed after the completion of the parcel. Where either one or the other of these methods is used, it is necessary to check or interfere with the passage through the machine of either the sheets or the parcels, which tends to also limit the speed.

In the invention in the present instance the method employed consists in using a web of paper and forming in the same the completed parcel before the wrapper is severed from the web. That is, the address is affixed, the article folded and wrapped, the paste applied and the flap secured, and finally the wrapper severed from the web. By employing this method the difficulty of using jackets, or wrappers, in the form of single sheets is avoided; and where the parcel forming mechanism consists of rotatable grippers the use of a wiper, or similar device, can be dispensed with. Also the address can be applied without interfering in any way with the operation of the machine, as it is applied to the web without checking or interfering in any way with its movement through the machine. Consequently, the machine employing such method can be operated at a high rate of speed.

The invention in the present instance for carrying out the foregoing method consists, primarily, of a web carrying device, a parcel forming mechanism for holding the article and drawing the web from the carrying device and wrapping it about the article while the part of the web so wrapped forms a part of the main web and operating to utilize the strain of the web to shape the article and to hold the same while the parcel is being formed.

It also consists in means for securing the jacket in place about the article and mechanism for severing the completed package from the web.

It also consists in an addressing mechanism located in the path of travel of the web for affixing the address to the part of the web forming the jacket before the latter is engaged by the parcel forming mechanism and wrapped about the article.

It further consists in the novel construction, combination, and arrangement of parts such as will be hereinafter more fully described, pointed out in the appended claims, and illustrated in the accompanying drawings.

In the drawings, in which similar reference characters designate corresponding parts, Figure 1 is a side elevation of a mailing machine embodying the invention. Fig. 2 is a front elevation of the folding and wrapping mechanism. Fig. 2ª is a detail view showing the brake mechanism. Fig. 3 is a plan view of the machine broken away in parts. Fig. 4 is a vertical sectional view of the parcel forming mechanism. Figs. 5 and 6 are detail sectional views showing the assembling mechanism in different positions.

Fig. 7 is a plan view of the same. Fig. 8 is a side view of the same. Fig. 9 is an end view of the same. Fig. 10 is a view of the end opposite to that shown in Fig. 9. Fig. 11 is a detail view showing the catch mechanism of the wing-blade. Fig. 12 is a detail view showing a plan of the gripping blades and their operative mechanism. Fig. 13 is a sectional view of the same, with the blades open. Fig. 14 is a detail view showing the blades closed. Figs. 15 to 18, inclusive, are detail views showing the pasting mechanism. Figs. 19 and 20 are detail views of the article feeding mechanism. Fig. 21 is an end view, partly in section, of the addressing mechanism. Figs. 22, 23 and 24 are detail views showing the severing blade. Fig. 25 is a rear elevation, partly in section, of the addressing mechanism. Fig. 26 is a detail view of the mechanism for intermittently rotating the gripper-blades shaft. Fig. 27 is a detail view showing the guideway and reservoirs of the addressing mechanism. Fig. 28 is a detail view showing the mechanism for operating the web roll. Fig. 29 is a plan view of the plunger and jaws at the lower part of the reservoir for receiving the stencil-plates.

The support of the several operative parts of the machine and their adjuncts may be of any construction suitable in the premises. In the present instance, however, it consists of a main frame on which is principally mounted the paper folding and wrapping mechanism, and of an auxiliary frame on which is principally placed the addressing mechanism and the mechanism for supporting the web roll. The main frame comprises the end frames 51 connected by the upper and lower cross-pieces 52, 52' and 53, 53', respectively, and the legs 54; and the auxiliary frame comprises the longitudinal pieces 55 bolted at their inner ends to one of the lower cross-pieces of the main frame and supported at their outer ends by the legs 56.

The main driving shaft 57 of the machine extends longitudinally through the main frame with its ends journaled in suitable bearings in the end pieces 51. It is rotated by the pulley 58 and the clutch mechanism 59 of the usual construction. The key 60 of the clutch mechanism is operated by the rock-shaft 61 provided with mechanism hereinafter to be described for partly rotating the same. (Fig. 2.) An automatic brake is provided for controlling the rotation of the driving shaft. (Fig. 2ᵃ.) On the shaft 57 is the sheave 63 over which passes the band 64 normally pressed together at its ends by the spring 65. By permitting the spring to act to press the ends of the band together, the friction between the band and the sheave will brake the shaft. To open the ends of the band against the action of the spring the cam 66 is provided. The latter is mounted on the rockshaft 61 and is interposed between the ends of the band and by turning the same the ends of the band can be opened and the brake thereby released. When the rockshaft is turned to connect the members of the clutch to drive the main shaft the position of the cam is such as to release the brake and also when the rock-shaft is turned to disconnect the members of the clutch the cam is turned to apply the brake.

On the opposite ends of the main frame are mounted the heads 67. (Figs. 2, 3, 12 and 13.) As these heads with their mountings and attachment are alike, a description of one will suffice for both. Each head is composed of two members bolted together and has an internal chamber 68. It has two arms 69 in the outer ends of which are bearings through which the rods 70 and 71 respectively pass, the rod 70 being longer than the other one. These rods are secured at their ends in brackets on the main frame of the machine. The head is movable longitudinally on these rods, but can be secured in any position to which it might be adjusted by the split bushings 72. The latter have wedge-shaped collars on one end and nuts turned on the other. By tightening the nuts the wedge-shaped collars can be forced between the rods and the bearings and the heads thereby secured in place.

In the upper part of the chamber 68 of the head is the pinion 73 having an elongated hub 74 journaled at its ends in the bearings 75 placed in the upper part of the head. On opposite sides of the pinion are washers 73ᵃ to prevent sidewise movement of the pinion. Movable longitudinally in the hub is the shaft 76, the latter being splined in the hub so as to be rotated with the same. (Fig. 13.) The pinion 73 is driven by the gear 77 in the lower part of the chamber 68 having an elongated hub 78 journaled at its ends in the bearings 79 placed in the lower part of the head. The gear 77 is splined on the shaft 80 passing through its hub and journaled at its ends in suitable bearings on the frame of the machine.

Mechanism is provided for intermittently rotating the shaft 76. (Figs. 2 and 26.) On the main driving shaft 57 is a wiper 81 adapted to engage with the star-wheel 82 secured to the gear 83 engaging with the gear 84 on the shaft 80. As the main driving shaft rotates the wiper revolves and engages with one of the recesses 85 of the star-wheel and rotates the latter so long as the engagement continues. On the main driving shaft, back of the wiper, is the locking wheel or cam 86. This locking wheel rotates in the same plane as the star-wheel and registers with one of the concave faces 87 on the star-wheel when the wiper is not in engagement and thereby holds the star-wheel against rotation. When the wiper is in engagement with the star-wheel, the cut-away portion 88 of the locking wheel registers with the star-wheel and permits the latter to rotate. The rotation of the shaft 80 is communicated to the shaft 76 by the gear 77 meshing with the pinion 73. Gripping blades 89 are mounted on the inner end of the shaft 76 adjacent to the path of travel of the web through the machine and in close juxtaposition to the assembling mechanism hereinafter to be described. These blades serve to engage the assembled article and web to fold and wrap the same together. These gripping blades 89 are respectively secured to the opposing jaws 90 pivoted on the end of the shaft 76. (Figs. 3, 4, 12, 13 and 14.) The bearings of the blades on the jaws are inclined, as at 92, so that by loosening and tightening the screws 93 and moving the blades in or out the bite of the latter can be adjusted to suit the thickness of the article. Blades of different widths are provided to accommodate articles of varying dimensions. The jaws, and consequently the blades, are normally held open by the spring 94. They are closed against the action of the spring by the annular wedge-shaped shoe 95 engaging with the inner ends of the arms 96 carried by the said jaws. When the shoe is forced under the inner ends of the arms the latter are moved outwardly and thereby close the jaws and blades. Set-screws 97 in the outer ends of the arms bear against the shoe and can be adjusted to compensate for any wear. The shoe is journaled on the end of the sleeve 98 loosely mounted on the shaft 76. The sleeve is recessed to form the bearing for the said shoe and the latter is held in place by the annular nut 99 turned into the end of the sleeve. A collar 100 on the shaft 76 limits the movement of the sleeve on the shaft in one direction and also limits the movement of the shaft in the head 67 in one direction. The movement of the shaft in the opposite direction is limited by the jam-nuts 101 on the outer end of the shaft. The shaft 76 is reciprocated by the cross-head 102 mounted on the rod 70 and the shaft 80 and connected with the sleeve 98. A lever 103 pivoted at 104 to the cross-piece 53 and having a sliding connection at its upper end with the cross-head and having a roll near its lower end engaging with the cam-groove in the wheel 105 on the main driving shaft moves the cross-head back and forth and thereby reciprocates the shaft 76.

When the shaft 76 is moved toward the interior of the machine, no action of the gripping blades takes place until the jam-nuts 101 on the outer end of the shaft engage with the head. When this engagement takes place, the movement of the shaft is stopped, but the sleeve 98 moves on the shaft and forces the annular shoe 95 under the arms 96 and thereby closes the gripping blades. At this point the reciprocating movement of the shoe ceases owing to the formation of the cam-grooves in the wheel 105 on the main driving shaft. Then about this time the wiper 81 on the main driving shaft engages with one of the recesses 85 of the star-wheel 82 and through the intervening mechanism rotates the shaft 76. The rotation of the shaft is sufficient to make one complete rotation of the gripping blades mounted on the shaft. After the completion of the rotation of the gripping blades, and after the operation of the assembling mechanism hereinafter to be described, the sleeve 98 is moved in the opposite direction. During the first part of the movement of the sleeve 98 in the opposite direction, the gripping blades 89 are held in the closed position (Fig. 14) owing to the friction of the set screws 97 upon the annular shoe 95 until said blades have withdrawn from the parcel and the collar 100 of the shaft 76 engages with the inner end of the pinion hub 74 contained therein. The continued movement of the sleeve 98 then withdraws the shoe 95 from engagement with the set screws 97 and thereby permits the gripping blades to open (Fig. 13) through the action of their springs and the several parts are in a position to repeat the operation.

Located adjacent to the gripping and winding blades 89 to coöperate with the same in forming the wrapped parcel is the assembling mechanism for associating the end of the web and the article to be wrapped. Vertically movable in the guides 106 (Figs. 2 and 4.) secured to the cross-piece 52' of the main frame and in a central position is the knee 107 from which project the standards 108. On the lower end of the knee is adjustably attached the arm 109 carrying the roller 110. The upward position of the knee 107 relative to the gripping blades which hold the completed parcel, can be regulated by adjusting the arm 109. With the roller 110 engages the cam 111 on the main driving shaft 57 and by means of which the knee and the parts carried by it are vertically reciprocated. A spring 112 connects the knee with the cross-piece 53' to retract the knee against the action of the cam.

In the ends of the standards 108 are secured the parallel horizontal rods 113. (Figs. 2 to 10 and 15 to 18, inclusive.) On the rear ends of these rods are adjustably secured the blocks 114 carrying the fixed plates 116 and 117. Beneath the lower plate is the stiffening bar 115. (Figs. 5 and 6.) These plates have between them a space in the path of travel of the web through the machine. These plates serve to guide the web to the movable assembling plates hereinafter described. At the rear end of the upper plate 116 is mounted a friction device whereby the web is kept taut and which prevents the paper from retracting after the jacket has been severed. It consists of a blade 118 provided with an elastic covering or sleeve which projects into the path of travel of the web between the plates, the upper plate being recessed for the purpose. (Figs. 4 to 9, inclusive.) This blade is carried by the shaft 119 journaled at its ends in the brackets 120 mounted on the blocks 114. It is normally pressed downwardly by the springs 121 connected with the same and the brackets. A finger-piece 122 is provided for turning the blade up out of the path of travel of the web.

On the front ends of the rods 113 are mounted the horizontal assembling plates 123 and 124, respectively, movable back and forth in the direction of the travel of the web. These plates serve to associate the web and the article to be wrapped. They are carried by the side-bars 125 slidable on the rods 113. These plates have an intervening space through which the web travels slightly below the space between the plates 116 and 117. The planes in which the plates 123 and 124 respectively move are immediately below the respective planes of the plates 116 and 117, so that the plate 123 will pass beneath the plate 116 and the plate 124 beneath the plate 117. (Fig. 5.) When the two sets of plates are moved together, as shown in Fig. 5, there will be a space between the inner ends of the plates 117 and 123. With this space registers the wing-blade 126 projecting into the path of travel of the web for gripping the paper against the lower plate 124 so that when the two sets of plates are separated, as shown in Fig. 6, the web will be carried along with the plates 123 and 124.

The wing-blade 126 is covered with an elastic sleeve and is carried by the shaft 127 journaled at its ends in the brackets 128 on the plate 123. It is pressed into engagement with the web by the spring 129, which only acts when the plates 123 and 124 are moved away from the fixed plates 116 and 117. When the movable plates have been moved away from the fixed plates, the cam 130, adjustably mounted on the support 131 secured on the standard 108, (Figs. 7 and 8.) engages with the roll 132 on the arm 133 of the shaft 127 and turns the latter so that the pawl 134 can engage with the shoulder on the hub of the arm and thereby hold the blade out of engagement with the paper. (Fig. 11.) When the movable plates reach the end of their movement toward the fixed plates the cam 135 on the upper fixed plate engages with the pawl and disengages the latter from the hub of the arm and permits the blade to be turned by the spring 129 into the path of travel of the web to engage with the paper. The spring 129 not only turns the blade but also operates the pawl 134. By adjusting the cam 130 on the support 131, to which it is connected by a bolt passing through a slot in the same, the distance which the blade will travel in engagement with the paper can be regulated. To permit the movement of the wing-blade relatively to the upper fixed plate 116, the latter is recessed. Secured to the cross-piece 52' and projecting in front of the assembling mechanism are the supporting springs 350. (Figs. 3 and 4.) These springs project between the inner ends of the gripping blades and slightly below the axis of the same to support the free end of the web projecting from the plates 123 and 124 preparatory to its seizure, together with the article, by the said blades.

The movable plates 123 and 124 are reciprocated by the levers 136 fulcrumed at their lower ends on the cross piece 53' of the main frame. (Figs. 1, 2, 4, 7 and 8.) The free ends of these levers are connected by the links 137 with the bosses 125ª on the side-bars 125 carrying the plates. The levers are oscillated by the cam-wheels 138, with the grooves in which rolls on the said levers register as shown by dotted lines in Fig. 4.

Means are provided for applying paste to the jacket after the latter has been wrapped around the folded article. (Figs. 2, 4 and 15 to 18, inclusive.) On the upper ends of the standards 139 secured on the cross-piece 52' are adjustably mounted the frames 140 carrying the paste reservoir 141. In the latter is journaled the doctor-roll 142 driven by the belt 143 passing over the pulley 144 on the shaft of the doctor-roll and over the pulley 145 on the main driving shaft 57. (Fig. 2.) A scraper 146 operates to move the surplus paste from the doctor-roll. A transfer-roll 147 is provided for carrying the paste from the doctor-roll to the paper jacket and applying it to the latter. The transfer-roll has its shaft journaled in the free ends of the levers 148 and the latter are pivoted at 149 to the free ends of the members 150 of the bell-cranks 151, which are fulcrumed on the brackets 152 carried by the cuffs 153 adjustable on the standards 139. The levers project beyond their pivotal points 149 and are connected by the links 154 with the ends of the springs 155 attached to the frames 140 of the paste reservoir. These springs serve to oscillate the levers 148 on their pivots 149 to depress the free ends of the same relatively to the members 150 of the bell-cranks. This depression is limited by the lips 156 of the members 150 engaging with the pins 157 on the levers. The springs also serve to raise the levers as a whole to engage the transfer-roll carried at their outer ends with the doctor-roll in the paste reservoir.

The movements of the bell-cranks and consequently the levers carried by them are controlled by mechanism connecting them with the assembling mechanism. To the bars 125 carrying the plates 123 and 124 are pivoted at one end the straps 158 having in their free ends the elongated slots 159. Screws 160 movable in the slots 159 connect the free ends of the straps with the free ends of the members 161 of the bell-cranks 151. When the assembling mechanism is in a lower position, as shown in Fig. 4, the levers 148 are raised so that the transfer-roll contacts with the doctor-roll. As the table is raised by the cam 111, the straps 158 move upwardly and oscillate the bell-cranks, the connections between the latter and the straps being in the lower or inner extremities of the slots 159. This movement of the bell-cranks lowers the levers until they engage with the adjustable stops 162 on the cuffs 153. By turning these stops to vary the elevation of their arms 163, which engage with the levers, the approach of the transfer-roll to the point of applying the paste can be regulated. After the levers have engaged the stops 162 any further oscillation of the bell-cranks will be permitted by the pivotal connections 149 between the levers and the members 150 of the bell-cranks. These pivotal connections also permit any vibrations of the levers caused by the movement of the parcel to which the transfer-roll is applying the paste. When the assembling mechanism reaches the upper limit of its movement the position of the levers will be as shown in Figs. 15 and 17. When the plates 123 and 124 are moved away from the fixed plates 116 and 117, the springs 155 oscillate the bell-cranks and thereby raise the levers so that the transfer-roll contacts with the doctor-roll. The continuation of the movement of the plates 123 and 124 after the transfer-roll contacts with the doctor-roll is permitted by the sliding connection between the straps 158 and the members 161 of the bell-cranks. This connection also permits the downward movement of the assembling mechanism and the horizontal movement of the plates 123 and 124 toward the fixed plates, as both downward and backward movements are made together. On the front edge of the plate 123 and on opposite sides of the same are secured the buffer springs 147ª which prevent the transfer-roll 147 from striking the said plate should the springs 155 not act quickly enough to move the transfer-roll out of the way when the plate moves upwardly.

A knife 164 is provided for severing the parcel after it is completed from the web. It is mounted on the shaft 165 journaled at its ends in the side-bars 125 and is normally held in a raised position against the edge 166 of the plate 124 by the spring 167. (Figs. 23 and 24.) The edge of the knife at the widest part projects slightly in front of the edge 166, which is well rounded to permit easy passage of the web. Its downward movement is limited by the stops 168. The knife is somewhat wider at its center and its edge is scalloped and serrated. This formation of the knife particularly adapts it to the severing of the web. The movement of the assembling mechanism toward the gripping blades holding the article folded with the end of the web, draws the body of the web over the edge 166 of the plate 124 into engagement with the projecting edge of the knife, thereby oscillating the latter until it engages the stops 168. The shaft 165 is so located in relation to the plate 124 that the oscillation of the knife presses its serrated edge farther into the web (Fig. 17), and engagement with the stops 168 causes it to part readily.

A brush 169 is secured to the under side of the plate 124 immediately back of the knife 164. (Figs. 4, 5, 6, 17 and 18.) It serves to press down the pasted edge of the jacket, and hold it during a short interval of time to permit the drying of the paste. The assembling plates 123, 124 and the brush 169 are adjusted to the proper height in relation to the gripping blades, which hold the completed parcel by means of the adjustable arm 109, which carries the roller 110, which engages the cam 111 (Figs. 2 and 4) as previously described. Immediately below the brush is a shelf 170 for receiving the wrapped parcel after it has been completed and holding it in contact with the brush. This shelf is secured between the side-pieces 171 attached to the side-bars 125 by the slotted hangers 172. The shelf 170 is provided with stripping stops 370, which serve as strippers to hold the completed parcel against the friction of withdrawal of the gripping blades. The connections between the side-pieces 171 and the hangers are movable in the slots of the latter and by means of the same the shelf can be adjusted relatively to the brush and to the gripping blades holding the completed parcel to receive parcels of different thicknesses. A plate 173 secured to the standard 108 serves to cover the space back of the shelf, which is movable over it.

A feed mechanism is provided for feeding the articles to the assembling mechanism. (Figs. 1, 19 and 20). Projecting from the front of the cross-piece 52 of the main frame are the brackets 174 on the forward ends of which is the shaft 175 with its ends journaled in the movable boxes 176. On the shaft are adjustably secured the grooved pulleys 177 at regular intervals apart. Over these pulleys and the loose pulley or sleeve 178 on the shaft 179 carried by the arms 180 on the forward ends of the brackets are the twisted bands 181. The tension of these bands is regulated by adjusting the journal boxes 176 by the set screws 176ª. On the loose pulley 178 are the corrugated rubber collars 181ª. The shaft 175 is driven by the belt 143 passing over the pulley 183 on the said shaft and over the pulley 145 on the main driving shaft 57. This belt also rotates the doctor-roll of the pasting mechanism. By rotating the shaft 175 motion is given to the twisted bands and any articles placed thereon will be fed onto the upper of the plates 123 and 124 of the assembling mechanism. In the uprights 185 on the inner ends of the brackets 174 is journaled the shaft 186 carrying the fingers 187 having their free ends turned upwardly. The shaft is rocked by the arm 188 which is oscillated by the strap 189 connecting it with the lever 190 pivoted on the shaft 61 and vibrated by the cam wheel 191 on the main driving shaft 57. The lever is pressed into engagement with the cam wheel by the spring 202. These fingers form stops against which the articles are moved by the twisted bands 181. They are moved at intervals, as the shaft 186 is rocked, to release the articles. To one side of the twisted bands is the longitudinal guide 192 carried by the upright 193 adjustable on one of the brackets 174. The twist in the bands is such as to move the articles against the longitudinal guide and the latter gives them their proper direction to the assembling mechanism. A spring finger 194 is provided for pressing the article against the twisted bands. The engaging end of the spring finger is serrated and it serves to prevent the article from rebounding when the latter strikes the stop fingers 187. It is carried by the arm 195 secured on the longitudinal guide 192. A roll 196 is journaled on the shaft 196ª secured in the free ends of the arms 197 journaled on the rock shaft 186 and presses the article onto the rubber collars 181ª as they are released by the fingers 187. The roll 196 is raised intermittently by the spring 197ª on the arm 197 engaging with the arm 188. This upward movement of the roll occurs after the article has been fed to the assembling mechanism.

The articles to be folded and wrapped are fed upon the plate 123 against the stops 203 when the assembling mechanism is in an advanced and raised position. On the said plate is a pawl 204 adapted to engage with the article and hold it in place until it is seized, together with the web, by the gripping blades. (Figs. 5, 6, 19 and 20.) This pawl is carried by the shaft 205 journaled in the brackets 206 secured on the assembling plate 123. The pawl is normally depressed by the spring 207 on the shaft 205 and the tension of the spring is regulated by the thumb-nut 208. On the shaft 205 is an arm 209 carrying a roll 210. During the upward movement of the assembling mechanism a lever 211 engages with the arm and raises the free end of the pawl so that the article can be fed under it. When the assembling mechanism reaches the forward end of its stroke the pawl is released and engages with the article to hold it in place. The lever 211 is carried by the shaft 212 journaled in the upper end of the standard 213. (Figs. 1, and 2.) The shaft is rocked by the lever 214 on said shaft and engaging at its free end with the cam 215 on the main driving shaft 57. The spring 215ª forces the lever into engagement with the cam.

Mechanism is provided for feeding the web from the roll mounted on the machine to the assembling mechanism. (Figs. 1 and 28.) On the rear end of the auxiliary frame are secured the side plates 216, projecting from the rear of which are the brackets 217. In the outer ends of the latter is journaled the shaft 218 for carrying the roll of paper from which the web is drawn. The web leaves the roll and is looped under the roll 219 journaled in the outer ends of the arms 220 secured at their inner ends on the shaft 221 journaled in bearings on the legs 56. The web then passes over the roll 222 journaled to the under side of the brackets 217 and leads between the fixed plates 116 and 117 of the assembling mechanism where it is engaged by the tension blade 118. The web is intermittently drawn off the roll by the wing-blade 126 on the plate 123, when the latter is moved forward, and also by the gripping blades 89 when the latter are rotated. As these intermittent movements of the web are quickly made, if the web should be drawn directly from the paper roll, the latter would overrun. This is avoided by the mechanism operated by the shaft 221. On an end of the latter is an arm 223 pivoted at its outer end to the lower end of the rod 224 connected at its upper end with the pivoted arm 225. A tension spring 226 normally tends to raise the rod 224. The tension of this spring can be regulated by adjusting the collar 227 on the rod. On the pivoted end of the arm 225 is the double cam 228 interposed between the ends of the friction band 229 passing around the sheave 230 on the shaft 218 carrying the paper roll. A spring 231 is on the bolt 232 passing through the ends of the band to press them together and to press the band into engagement with the sheave. The tension of this spring can be regulated by the nut on the end of the bolt. By rotating the cam 228 the ends of the band can be opened against the action of the spring 231 and the friction between the band and the sheave released. When the web is drawn forward the loop around the roll 219 is shortened and the arms 220 are consequently raised against the action of the spring 226. As soon as the spring is placed under tension, through the intervening mechanism, it depresses the roll 219 and gradually draws the web from the roll to increase the length of the loop preparatory to the next action of the feeding mechanism. By this means the roll is rotated comparatively slowly and is less apt to overrun. Furthermore, when the loop becomes of sufficient length the cam 228 is turned and permits the friction band to engage with the sheave and thereby stops the roll from further movement until the loop is shortened again.

There is provided a mechanism to coöperate with the brake mechanism for stopping the machine at a predetermined point, that is, at the completion of an operation and in readiness to commence another. Pivoted to the under side of one of the brackets 174 is the knee lever 198 connected by the rod 199 with the arm 200 on the brake operating shaft 61. (Figs. 2, 4, 19 and 20.) By means of the lever 198 and the intervening mechanism the shaft 61 is partly rotated to operate the brake mechanism and the clutch mechanism to set the machine in motion. On the shaft 61 is pivoted the angular lever 232 having at its lower end a roll riding on the periphery of one of the cam-wheels 138 having the depression 233. This wheel is secured on the main driving shaft 57 and the roll is pressed against the periphery by the spring 236 connected with the extension 235 of the lever and the cross-piece 52. Pivoted to the cross-piece 52 is the latch 237 adapted to engage with the catch 238 fixed on the shaft 61. Pivoted on the latch is the pawl or dog 239 adapted to engage with a lug or pin on the extension 235 of the lever. When the shaft 61 is partly rotated so as to set the machine in motion, the catch 238 will be moved to a position to be engaged by the latch 237. As the wheel 138 is rotated, owing to the depression 233, the lever 232 is intermittently oscillated. When the roll on the lower end of the lever enters the depression, the pin or lug on the extension 235 engages with the pawl or dog 239 and as the roll leaves the depression through such engagement the latch 237 is raised clear of the catch 238 until tripped by the projection 240 engaging with the latch. Should the controlling mechanism be released during the progress of an operation of the machine, the latch 237 would engage with the catch 238 and the shaft 61 could not turn to disconnect the members of the clutch and to apply the brakes. The engagement of the latch and catch would continue until the latch was raised by the lever 232 having its roll engaging with the depression 233 of the wheel 138. As the roll left the depression the latch and the catch would be disengaged and the shaft 61 thereby permitted to rotate to stop the machine at an initial position as shown in Fig. 4. The shaft 61 is normally held by the spring 65, compressing the ends of the band about the sheave and bearing on the cam to stop the operation of the machine.

In the path of travel of the web is mounted the mechanism for printing the address on that portion of the web which forms a jacket before the said portion is engaged by the wrapping mechanism. (Figs. 1, 21, 25, 27 and 29.) This addressing mechanism is mounted on the carriage comprising the side frames 216 and the cross-piece 216$^a$ movably mounted on the longitudinal pieces 55 of the auxiliary frame. This carriage is adjustable longitudinally of the path of travel of the web so that the addressing mechanism can be regulated to apply the address at the proper place on the web. The carriage is secured in its adjustment on the auxiliary frame by the bolts 216$^b$ passing through the flanges of the side frames 216 and the longitudinal pieces 55, the latter being slotted for the purpose as shown at 55$^a$ in Fig. 3. On the upper part of the side-pieces 216 carried by the auxiliary frame is placed the guide-way 241 immediately below and transversely of the path of travel of the web from the roll 222 to the fixed plates of the assembling mechanism. On one end of this guide-way is the reservoir 242 in which are placed the stencil plates preparatory to applying the addresses and on the opposite end is placed the reservoir 243 for receiving the stencil plates after they have been used. In passing it may be said that the stencil plates consist of a frame of rectangular shape in which is secured the plate having the address cut therein in the usual manner. The stencil plates are arranged in order and placed in the reservoir 242 from the bottom of which they are fed consecutively through the guide-way to the reservoir 243. In the grooves 244 immediately below the guide-way is a movable plate 245 (Fig. 27.) which is reciprocated by the lever 246 with which it is connected by the rod 247. Pivoted to the under side of this plate and projecting upwardly through a slot in the same is the spring pressed pawl 248. When the plate is moved beneath the reservoir toward the other reservoir the pawl engages with the frame of the lower-most stencil plate in the reservoir 242 and moves it along the guide-way 241. This movement of the pawl is sufficient to move the stencil-plate clear of the reservoir. On the return movement of the plate 245, the pawl passes beneath the stencil-plate that it has just moved to a position to engage with the succeeding stencil-plate. This movement of the pawl is permitted by its formation and the tension of its spring. When the succeeding stencil-plate is moved into the guide-way it forces the preceding one ahead of it so that there are three stencil-plates in the guide-way at the same time between the two reservoirs. In the lower end of the reservoir 242 is a plate 249 for guiding the stencil-plates toward the side of the reservoir opening into the guide-way. The stencil-plates are moved along the guide-way to the reservoir 243 into the lower end of which they are received.

Beneath the reservoir 243 is the follower 250 on the upper end of the rod 251 connected at its lower end by the link 252 with the free end of the lever 253, by means of which the said follower is vertically reciprocated. (Figs. 21, 25 and 29.) This lever is pivoted to the side frame 216 and is vibrated by the wheel 254 provided with a cam-groove with which a roll on the lever engages. The wheel is driven by the shaft 255 on which it is placed and the shaft is rotated by the sprocket chain 256 passing over the sprocket-wheel 257 on said shaft and the sprocket-wheel 258 on the driving shaft 57. The slack in the chain is taken up by the idler 259 adjustable on the support 260.

After a stencil plate moves into the lower part of the reservoir 243 it is moved up into the same out of the way of the succeeding stencil plates. This is done by the follower 250. Mechanism is provided for holding the stencils in their elevated positions in the reservoir 243 so that they will not fall back when the follower descends. Pivoted at their lower ends to the bracket 261, projecting from the side frame 216, are the opposite jaws 262 normally pressed toward each other by the spring 263 connecting them. On the upper ends of these jaws are the plates 264 projecting horizontally into the lower part of the reservoir 243 and on which rest the stencil plates in the said reservoir when the follower 250 is in a lowered position. When the follower moves upward to raise a stencil-plate into the lower part of the reservoir, the arms 265 projecting from the collar 266 secured on the plunger rod 251 engage with the toggle levers 267 pivoted to the inner sides of the jaws 262 and the latter are thereby forced apart against the action of the spring 263 so that the stencil plate can pass between the inner ends of the plates 264. The ends of the toggle levers are normally depressed by the spring 263 that presses the jaws together. As the follower approaches the upper limit of its movement the toggle levers 267 are forced out of engagement with the arms 265 and the spring 263 is permitted to press the upper ends of the jaws toward each other so that the plates 264 carried by them will pass beneath the stencil plates and hold them in their elevated position. To pass the jaws on its downward movement the follower is recessed as shown in Fig. 29. The limit of the movement of the jaws toward each other is regulated by the set-screws 268 passing through said jaws and impinging on the frame of the guide-way.

When the stencil-plate reaches a position in the guide-way midway of the reservoirs it is inked by the transfer-roll 269 journaled in the free end of the arm 270 pivoted to the upper end of the lever 246. (Figs. 1, 21, 25 and 27.) This lever is fulcrumed at its lower end to the frame of the machine and is oscillated by the cam-groove 271 of the wheel 272 engaging with a roll on the said lever, the wheel being mounted on the shaft 255. The arm 270 has an extension 273 hinged at its lower end to the inner end of the rod 274. The other end of the rod passes through an opening in the side plate 216 and registers with the friction-box 275 pivoted to the outside of the side plate. By means of the set-screws 276 the friction between the rod and the box can be regulated. On the outer end of the rod 274, which projects beyond the friction-box, is the coiled spring 278 between the friction-box and the washer 277 held in place by a pin. This spring tends to draw the rod outwardly through the friction-box for a short distance. On the lever 246 is an adjustable hook 279 adapted to engage with the extension 273 of the arm 270. When the lever 246 is in the position shown in Fig. 25, the spring 278 is compressed between the washer 277 and the end of the friction-box 275 and tends to hold the extension 273 in engagement with the hook 279. When the lever is oscillated in the opposite direction, for a short distance the relative position of the lever 246 and the arm 270 will be preserved through the action of the spring 278 holding the extension 273 in engagement with the hook 279. By this the transfer-roll 269 is held in a depressed position so that it will clear the frame of the stencil plate. As the oscillation continues the spring 278 ceases to act and the movement of the rod 274 is retarded by the friction-box 275. This will move the lower end of the extension 273 toward the lever 246 and thereby oscillate the arm 270 to raise the transfer-roll 269 to contact with the stencil plate to apply the ink. By means of the friction-box the transfer-roll is pressed evenly and smoothly against the entire length of the stencil-plate. On the return oscillation of the lever 246 the hook engages with the extension 273 and the several parts will be returned to their original positions. An ink reservoir is secured to the frame of the machine adjacent to the path of travel of the transfer-roll. (Fig. 25.) In it is journaled the doctor-roll 281 driven by the belt 282 passing over the guiding pulleys 283 and the driving pulley 284 on the shaft 255. A distributing roll 285 carried by the pivoted arm 286 is pressed by the spring 287 against the doctor-roll.

Immediately above the guide-way is the movable platen 288 adapted to coöperate with the transfer-roll 269 in applying the ink to the web. (Figs. 1, 21, 25 and 27.) The stem 289 of the platen is movable in a vertical guide in the cross-head 290. A spring 291 attached at its lower end to the cross-head and connected at its upper end by the adjusting screw 292 with the upper end of the stem 289 normally depresses the platen to force the web against the stencil-plate. The pressure of the platen can be regulated by means of the adjusting screw.

The platen is raised after each operation of the inking roll to permit the free travel of the web and also of the stencil-plates. In the bracket 293 projecting from the cross-head 290 and the bracket 294 projecting from the arm 217 is journaled the shaft 295. On the inner end of this shaft is an arm 296 engaging at its free end with the roll 298 on the upper end of the stem of the platen. On the outer end of the shaft is the arm 299 connected by the rod 300 with the lever 301 vibrated by the cam-wheel 302 on the shaft 255. By means of this mechanism the platen is intermittently raised and lowered. The position of the cam-wheel is such as to permit the platen to descend to press the web against the stencil-plate at the time the ink is applied by the transfer-roll.

The operation of the machine is as follows: In the initial positions of the operative parts of the machine preparatory to a parcel forming operation, the shafts 76 carrying the gripping blades 89 are withdrawn to their extreme outward limit with the blades open. The assembling mechanism is in its lowermost position and also at the rearward limit of its movement so that the space between the guide plates 116 and 117 will be in line with the axis of rotation of the gripping blades. The paste applying roll 147 is in contact with the doctor-roll in the paste reservoir. The end of the web of which is formed the jacket for the next parcel to be made projects from the front edges of the assembling plates 123 and 124, a sufficient distance to be even with the projecting end or edge of the article to be wrapped which lies on the top of the plate 123 against the stops 203 previously adjusted to give the article the proper position relative to the end of the web. At the same time another article rests upon the twisted bands 181 of the article feeding mechanism against the stops 187 ready to be fed to the assembling mechanism for the next wrapping operation. The web is held in place in the assembling mechanism by the friction blade 118 on the rear end of the fixed guide-plate 116 against the action of the looping mechanism for drawing the web from the paper roll. The addressing mechanism, by means of its carriage being adjustable on the auxiliary frame, is moved to a position so that it will accommodate the wrappers or jackets being used. If short wrappers are being used, it will be nearer to the parcel forming mechanism than it would if longer ones were needed. The length of the wrapper depends on the size of the parcel and more or less web will be drawn from the roll accordingly as the parcels formed are large or small. The addressing mechanism operates while the parcel forming mechanism is at rest and the web is stationary.

When the machine is put in motion, the action of its operative parts is as follows: The shafts 76 carrying the gripping blades 89 are moved inwardly until the nuts 101 engage the head 67. Further movement of the cross-heads 102 causes the annular shoes 95 to close the blades upon the edges of the article and the end of the web projecting from the plates 123 and 124 of the assembling mechanism. After the engagement of the article and web by the gripping blades the latter are given a complete rotation to wrap the web and article about each other and also about the blades to form a parcel.

During the rotation of the wrapping blades, the assembling mechanism is moved upwardly so as to place the finishing brush 169 in operative position. This upward movement of the assembling mechanism, through the intermediate mechanism, depresses the transfer-roll 147 to contact with the parcel being formed just before the rotation of the gripping blades is completed. As the blades finish their rotation, the parcel and transfer-roll engage with each other and the paste is applied. This engagement is limited by the stop 163, which has been previously adjusted.

The upward movement of the assembling mechanism, carrying the web with it to a position above the parcel being formed, will cause a bight or loop in the web to be formed over the edge of the knife 164 projecting in advance of the plates 123 and 124. A forward movement of the assembling mechanism now takes place and the transfer-roll is released and is returned by the springs 155 to its original position in contact with the doctor-roll. The forward movement of the assembling mechanism causes the knife to rotate, owing to the pull of the web, and press a fold of the loop against the wrapped part of the parcel to which the paste has been applied. As the forward movement continues the parcel is severed from the web and the finishing brush contacts with the flap and holds it against the pasted surface of the parcel.

During the forward movement of the assembling mechanism, the auxiliary feed blade or wing-blade 126 engages with the end of the web and carries it forward, after the parcel has been severed from the web, until the web is released through the engagement of the roll 132 with the adjustable cam 130 and the wing blade 126 is held out of engagement with the web by means of the engagement of the pawl 134 with the shoulder on the hub of the arm 133. At the end of the backward movement of the assembling mechanism the pawl 134 is released by contact with the fixed cam 135 and the wing-blade resumes engagement with the web. When the assembling mechanism moves backward the web remains in a forward position to be engaged by the gripping blades in forming the next parcel. The outer end of the web rests on the supporting springs 350 until it is so engaged. Also, during the forward movement of the assembling mechanism the article feeding mechanism deposits the article for the next parcel on the plate 123 against the stops 203 previously adjusted to accommodate the article. The latter is held in place by the spring pressed pawl 205. The position of the article, when so placed, is such that it will be engaged, together with the end of the web, by the gripping blades preparatory to the formation of the next parcel.

When the assembling mechanism completes its forward movement the parcel is finished. Here the assembling mechanism pauses while the gripping blades are withdrawn from the parcel, which action is facilitated by the stops 370 on the receiving shelf 170 and the parcel is left on the said shelf beneath the finishing brush to be displaced by the succeeding parcel and dropped into the delivery spout 470. After the withdrawal of the gripping blades, the assembling mechanism moves backwardly and downwardly to its initial position.

While the hereinbefore described embodiment of the invention is the preferred one, yet it can be departed from to a considerable extent without departing from the spirit of the invention.

Having thus described my invention, what I claim and desire to secure by Letters Patent is:

1. In a mailing machine, a web carrying device, a parcel forming mechanism for wrapping the article in a part of the web while such part is integral with the main web and said forming mechanism operating to utilize the strain of the web to shape and to hold the article while the parcel is being formed, and means for completing the package while such wrapped part of the web remains integral with the main web.

2. In a mailing machine, a web carrying device, a parcel forming mechanism for wrapping the article in a part of the web while such part is integral with the main web and said forming mechanism operating to utilize the strain of the web to shape and to hold the article while the parcel is being formed, means including a severing device for completing the package while such wrapped part of the web remains integral with the main web, and mechanism for actuating said severing device to divide the wrapped part of the web from the main part of the web after the package is completed.

3. In a mailing machine, a web carrying device, a parcel forming mechanism for wrapping the article in a part of the web while such part is integral with the main web and said forming mechanism operating to utilize the strain of the web to shape and to hold the article while the parcel is being formed, and means for securing the wrapped part of the web to the parcel while such part remains integral with the main web.

4. In a mailing machine, a web carrying device, a parcel forming mechanism for wrapping the article in a part of the web while such part is integral with the main web and said forming mechanism operating to utilize the strain of the web to shape and to hold the article while the parcel is being formed, means including a severing device for securing the wrapped part of the web to the parcel while such part remains integral with the main web, and mechanism for actuating said severing device to divide the wrapped part of the web from the main web after the package is completed.

5. In a mailing machine, a web carrying device, a parcel forming mechanism for holding the article to be wrapped and drawing a part of the web from said carrying device and wrapping it about the article while such part of the web so wrapped forms part of the main web and said forming mechanism operating to utilize the strain of the web to shape and to hold the article while the parcel is being formed, means including a severing device for securing the wrapped part of the web about the parcel while such part remains integral with the main web, and means for actuating said severing device to divide the parcel from the web after the wrapped part of the web has been secured.

6. In a mailing machine, a web carrying device, a parcel forming mechanism for holding the article to be wrapped and drawing a part of the web from said carrying device and wrapping it about the article while such part of the web so wrapped forms part of the main web and said forming mechanism operating to utilize the strain of the web to shape and to hold the article while the parcel is being formed, an addressing device, means including a severing device for securing the wrapped part of the web about the article while such part remains integral with the main web, and means for actuating said severing device to divide the parcel from the web after the wrapped part of the web has been secured.

7. In a mailing machine, a web carrying device, a parcel forming mechanism for holding the article to be wrapped and drawing the web from said carrying device and wrapping it about the article while the part of the web so drawn and wrapped forms part of the main web and said forming mechanism operating to utilize the strain of the web to shape and to hold the article while the parcel is being formed, an addressing device, a tension device for retarding the web when moved by said parcel forming mechanism, means including a severing device for securing the wrapped part of the web about the article while such part remains integral with the main web, and mechanism for actuating said severing device to divide the parcel from the web after the wrapped part of the web has been secured.

8. In a mailing machine, a web carrying device, a parcel forming mechanism for holding the article to be wrapped and drawing part of the web from said carrying device and wrapping it about the article while the part of the web so wrapped forms part of the main web and said forming mechanism operating to utilize the strain of the web to shape and to hold the article while the parcel is being formed, a tension device for retarding the web when moved by said parcel forming mechanism, means including a severing device for securing the wrapped part of the web about the article while such part remains integral with the main web, and means for actuating said severing device to divide the parcel from the web after the wrapped part of the web has been secured.

9. In a mailing machine, a device for carrying a web under tension, a parcel forming mechanism for drawing the web from said carrying device and wrapping the article in the same, while the part of the web so drawn forms part of the main web and said forming mechanism operating to utilize the strain of the web to shape and to hold the article while the parcel is being formed, and means for completing the package while the wrapped part of the web remains integral with the main web.

10. In a mailing machine, a device for carrying a web under tension, a parcel forming mechanism for wrapping the article in a part of the web drawn from said carrying device while such part is integral with the main web and said forming mechanism operating to utilize the strain of the web to shape and to hold the article while the parcel is being formed, means including a severing device for completing the package while the wrapped part of the web remains integral with the main web, and mechanism for actuating said severing device to divide the wrapped part of the web from the main web after the package is completed.

11. In a mailing machine, a device for carrying a web under tension, a parcel forming mechanism for wrapping the article in a part of the web drawn from said carrying device while such part is integral with the main part of the web and said forming mechanism operating to utilize the strain of the web to shape and to hold the article while the parcel is being formed, and means for securing the wrapped part of the web about the article while such part is integral with the main web.

12. In a mailing machine, a device for carrying a web under tension, a parcel forming mechanism for wrapping the article in part of the web drawn from said carrying device while such part is integral with the main part of the web and said forming mechanism operating to utilize the strain of the web to shape and to hold the article while the parcel is being formed, means including a severing device for securing the wrapped part of the web about the article while such part remains integral with the main web, and means for actuating said severing device to divide the parcel from the web after the wrapped part of the web has been secured.

13. In a mailing machine, a web carrying device, rotatable grippers for wrapping the article in a part of the web while such part is integral with the main web and operating to utilize the strain of the web to fold and to hold the article on the grippers while the parcel is being formed, and means for completing the package while the wrapped part of the web remains integral with the main web.

14. In a mailing machine, a web carrying device, rotatable grippers for wrapping the article in a part of the web while such part is integral with the main web and operating to utilize the strain of the web to fold and to hold the article on the grippers while the parcel is being formed, and means for securing the wrapped part of the web about the article while such part remains integral with the main web.

15. In a mailing machine, a web carrying device, rotatable grippers for wrapping the article in a part of the web while such part is integral with the main web and operating to utilize the strain of the web to fold and to hold the article on the grippers while the parcel is being formed, means including a severing device for completing the package while the wrapped part of the web remains integral with the main web, and means for actuating said severing device to divide the completed package from the main web.

16. In a mailing machine, a web carrying device, rotatable grippers for wrapping the article in a part of the web while such part is integral with the main web and operating to utilize the strain of the web to fold and to hold the article on the grippers while the parcel is being formed, means including a severing device for securing the wrapped part of the web about the article while such wrapped part is integral with the main web, and means for actuating said severing device to divide the parcel from the main web after the wrapped part of the web has been secured.

17. In a mailing machine, a web carrying device, rotatable grippers for holding the article to be wrapped and drawing a part of the web from said carrying device and winding it about the article while the part of the web so wound forms part of the main web and operating to utilize the strain of the web to fold and to hold the article on the grippers while the parcel is being formed, means including a severing device for securing the wound part of the web about the article while such wound part remains integral with the main web, and means for actuating said severing device to divide the parcel from the web after the wound part of the web has been secured.

18. In a mailing machine, a web carrying device, rotatable grippers for holding the article to be wrapped and drawing a part of the web from said carrying device and winding it about the article while the part so wound forms part of the main web and operating to utilize the strain of the web to fold and to hold the article on the grippers while the parcel is being formed, an addressing device, means including a severing device for securing the wound part of the web about the article while such wound part is integral with the main web, and means for actuating said severing device to divide the parcel from the main web after the wound part of the web has been secured.

19. In a mailing machine, a web carrying device, rotatable grippers for holding the article to be wrapped and drawing the web from said carrying device and winding it about the article while such wound part forms part of the main web and operating to utilize the strain of the web to fold and to hold the article on the grippers while the parcel is being formed, a tension device for retarding the web when moved by said grippers, means including a severing device for securing the wound part of the web about the article while such wound part is integral with the main web, and means for actuating said severing device to divide the parcel from the web after the wound part of the web has been secured.

20. In a mailing machine, a web carrying device, rotatable grippers for holding the article to be wrapped and drawing the web from said carrying device and winding it about the article while such wound part is integral with the main web and operating to utilize the strain of the web to fold and to hold the article on the grippers while the parcel is being formed, an addressing device for placing the address on the wound part of the web before it reaches the rotatable grippers, means including a severing device for securing the wound part of the web about the article while such wound part remains integral with the main web, and means for actuating said severing device to divide the parcel from the web after the wound part has been secured.

21. In a mailing machine, an assembling device for associating the end of a web and the article to be wrapped, means for supplying the paper in the form of a web and feeding the article to said assembling device, a parcel forming mechanism for wrapping together the end of the web and the article associated by said assembling device and said forming mechanism operating to utilize the strain of the web to shape and to hold the article while the parcel is being formed, and means for completing the package while the wrapped part of the web is integral with the main web.

22. In a mailing machine, an assembling device for associating the end of a web and the article to be wrapped, means for supplying paper in the form of a web and feeding the article to be wrapped to said assembling device, a parcel forming mechanism for wrapping together the end of the web and the article associated by said assembling device and said forming mechanism operating to utilize the strain of the web to shape and to hold the article while the parcel is being formed, and means for securing the wrapped part of the web about the article while such wrapped part is integral with the main web.

23. In a mailing machine, an assembling device for associating the end of a web and the article to be wrapped, means for supplying paper in the form of a web and feeding the article to said assembling device, a parcel forming mechanism for wrapping together the end of the web and the article associated by said assembling device and said forming mechanism operating to utilize the strain of the web to shape and to hold the article while the parcel is being formed, means including a severing device for completing the package while the wrapped end of the web is integral with the main web, and means for actuating said severing device to divide the wrapped end of the web from the main web after the package has been completed.

24. In a mailing machine, an assembling device for associating the end of a web and the article to be wrapped, means for supplying paper in the form of a web and for feeding the article to said assembling device, a parcel forming mechanism for wrapping together the end of the web and the article associated by the assembling device and said forming mechanism operating to utilize the strain of the web to shape and to hold the article while the parcel is being formed, means including a severing device for securing the wrapped end of the web about the article while such end remains integral with the main web, and means for actuating said severing device to divide the parcel from the main web after the wrapped end of the web has been secured about the article.

25. In a mailing machine, an assembling device, for associating the end of the web and the article to be wrapped, means for supplying paper in the form of a web and for feeding the article to the assembling device, an addressing device for placing the address on the web before it reaches the assembling device, a parcel forming mechanism for wrapping together the end of the web and the article associated by said assembling device and said forming mechanism operating to utilize the strain of the web to shape and to hold the article while the parcel is being formed, means including a severing device for securing the wrapped end of the web about the article while such end remains integral with the main web, and means for actuating said severing device to divide the parcel from the web after the wrapped end of the web has been secured about the article.

26. In a mailing machine, an assembling device for associating the end of a web and the article to be wrapped, means for supplying paper in the form of a web and for feeding the article to said assembling device, a parcel forming mechanism for wrapping together the end of the web and the article associated by the assembling device and said forming mechanism operating to utilize the strain of the web to shape and to hold the article while the parcel is being formed, a tension device for retarding the movement of the web to said parcel forming mechanism, and means for completing the package while the wrapped end of the web remains integral with the main web.

27. In a mailing machine, an assembling device for associating the end of a web and the article to be wrapped, means for supplying paper in the form of a web and for feeding the article to said assembling device, a parcel forming mechanism for wrapping together the end of the web and the article associated by said assembling device and said forming mechanism operating to utilize the strain of the web to shape and to hold the article while the parcel is being formed, an addressing device for placing the address on the web before the latter reaches the assembling device, a tension device for retarding the movement of the web to said parcel forming mechanism, and means for completing the package while the wrapped end of the web remains integral with the main web.

28. In a mailing machine, an assembling device for associating the end of a web and the article to be wrapped, means for supplying paper in the form of a web and for feeding the article to said assembling device, a parcel forming mechanism for wrapping together the end of the web and the article associated by said assembling device and said forming mechanism operating to utilize the strain of the web to shape and to hold the article while the parcel is being formed, an addressing mechanism for placing the address on the web before the latter reaches the assembling device, a tension device for retarding the movement of the web to said parcel forming mechanism, means including a severing device for securing the wrapped end of the web about the article while such end is integral with the main web, and means for actuating said severing device to divide the parcel from the web after the wrapped end has been secured.

29. In a mailing machine, an assembling device for associating the end of a web and the article to be wrapped, means for supplying paper in the form of a web and for feeding the article to said assembling device, rotatable grippers for engaging the article and the web associated by said assembling device and winding the end of the web about the article while such end is integral with the main web and said grippers operating to utilize the strain of the web to fold and to hold the article on the grippers while the parcel is being formed, and means for completing the package while the wound end of the web remains integral with the main web.

30. In a mailing machine, an assembling device for associating the end of a web and the article to be wrapped, means for supplying paper in the form of a web and the article to said assembling device, rotatable grippers for engaging the article and the end of the web associated by said assembling device and winding the end of the web about the article while such end is integral with the main web and said grippers operating to utilize the strain of the web to fold and to hold the article on the grippers while the parcel is being formed, and means for securing the wrapped end of the web about the article while such end remains integral with the main web.

31. In a mailing machine, an assembling device for associating the end of a web and the article to be wrapped, means for supplying paper in the form of a web and for feeding the article to said assembling device, rotatable grippers for engaging the article and the end of the web associated by the assembling device and winding the end of the web about the article while such end is integral with the main web and said grippers operating to utilize the strain of the web to fold and to hold the article on the grippers while the parcel is being formed, means including a severing device for completing the package while the end of the web is integral with the main web, and means for actuating said severing device to divide the end of the web so wound after the package has been completed.

32. In a mailing machine, an assembling device for associating the end of a web and the article to be wrapped, means for supplying the paper in the form of a web and for feeding the article to said assembling device, rotatable grippers for engaging the article and the end of the web associated by the said assembling device and winding the end of the web about the article to form a parcel while such end is integral with the main web and said grippers operating to utilize the strain of the web to fold and to hold the article on the grippers while the parcel is being formed, means including a severing device for securing the end of the web about the article while such end remains integral with the main web, and means for actuating said severing device to divide the parcel from the web after the end of the web has been secured.

33. In a mailing machine, an assembling device for associating the end of a web and the article to be wrapped, means for supplying paper in the form of a web and for feeding the article to said assembling device, rotatable grippers for engaging the article and the end of the web associated by said assembling device and winding the end of the web about the article to form a parcel while such end is integral with the main web and said grippers operating to utilize the strain of the web to fold and to hold the article on the grippers while the parcel is being formed, an addressing device for applying the address to the web before the latter reaches the grippers, means including a severing device for securing the end of the web about the article while such end remains integral with the main web, and means for actuating said severing device to divide the parcel from the web after the end of the web has been secured.

34. In a mailing machine, an assembling device for associating the end of a web and the article to be wrapped, means for supplying paper in the form of a web and for feeding the article to said assembling device, rotatable grippers for engaging the article and the end of the web associated by said assembling mechanism and winding the end of the web about the article to form a parcel while such end is integral with the main web and said grippers operating to utilize the strain of the web to fold and to hold the article on the grippers while the parcel is being formed, a tension device for retarding the movement of the web to the grippers, and means for completing the package while the end of the web remains integral with the main web.

35. In a mailing machine, an assembling device for associating the end of a web and the article to be wrapped, means for supplying paper in the form of a web and for feeding the article to said assembling device, rotatable grippers for engaging the article and the end of the web associated by said assembling device and winding the end of the web about the article to form a parcel while such end is integral with the main web and said grippers operating to utilize the strain of the web to fold and to hold the article on the grippers while the parcel is being formed, an addressing mechanism for placing the address on the web before the latter reaches the rotatable grippers, a tension device for retarding the movement of the web to said grippers, means including a severing device for securing the end of the web about the article while such end remains integral with the main web, and means for actuating said severing device to divide the parcel from the web after the end of the web has been secured.

36. In a mailing machine, rotatable grippers for winding the end of a web about an article to form a parcel and operating to utilize the strain of the web to fold and to hold the article on the grippers while the parcel is being formed, an assembling device for associating the article and the end of the web preparatory to their engagement by said grippers, and means for completing the package while the end of the web remains integral with the main web.

37. In a mailing machine, rotatable grippers for winding the end of a web about an article to form a parcel, means for reciprocating said grippers in the line of the axis of their rotation, an assembling device movable relatively to the axis of rotation of said grippers for associating the article and the end of the web preparatory to their engagement by said grippers, and means for completing the package while the end of the web remains integral with the main web.

38. In a mailing machine, rotatable grippers for winding the end of a web about an article to form a parcel and operating to utilize the strain of the web to fold and to hold the article on the grippers while the parcel is being formed, an assembling mechanism for associating the article and the end of the web preparatory to their engagement by said grippers, means for feeding the article and the end of the web to said assembling mechanism, and means for completing the package while the end of the web remains integral with the main web.

39. In a mailing machine, rotatable grippers for winding a jacket about an article to form a parcel, means for reciprocating said grippers in the line of the axis of their rotation, an assembling device for associating the article and its jacket preparatory to their engagement by said grippers, means for causing a relative reciprocation between said assembling device and grippers in a direction crosswise to the axis of rotation of the grippers, and means for feeding the article and jacket to said assembling device.

40. In a mailing machine, rotatable grippers for winding a jacket about an article to form a parcel, means for reciprocating said grippers in the line of the axis of their rotation, an assembling device movable back and forth crosswise relatively to the axis of rotation of said grippers for associating the article and its jacket preparatory to their engagement by said gripper, and means for feeding the article and jacket to said assembling device.

41. In a mailing machine, rotatable grippers for winding a part of a web about the article to be wrapped to form a parcel while the part of the web so wound is integral with the main web, means for reciprocating said grippers in the line of the axis of their rotation, an assembling device for associating the article and the web preparatory to their seizure by said grippers and movable back and forth crosswise relatively to the axis of rotation of said grippers, a pasting mechanism for applying paste to the web and means for securing the pasted end in place.

42. In a mailing machine, rotatable grippers for winding a part of a web about the article to be wrapped to form a parcel while the part of the web so wound is integral with the main web, means for reciprocating said grippers in the line of the axis of their rotation, and an assembling device for associating the article and the web preparatory to their seizure by said grippers and movable back and forth crosswise relatively to the axis of rotation of said grippers.

43. In a mailing machine, rotatable grippers for winding the end of a web about an article to form a parcel, a movable assembling device for associating the article and the end of the web preparatory to their seizure by said grippers, a pasting mechanism operated by the movement of said assembling device for applying paste to the end of the web as the parcel is rotated by said grippers, and means for securing the pasted end in place while such end remains integral with the main web.

44. In a mailing machine, rotatable grippers for winding the end of a web about an article to form a parcel, means for reciprocating said grippers in the line of the axis of their rotation, an assembling mechanism movable back and forth relatively to the axis of rotation of said grippers for associating the article and the end of the web preparatory to their seizure by said grippers, a pasting mechanism operated by the movement of said assembling mechanism for applying the paste to the end of the web when said parcel is rotated by said grippers, and means for securing the wound end of the web in place while such end remains integral with the main web.

45. In a mailing machine, rotatable grippers for winding the end of a web about an article to form a parcel, a movable assembling device for associating the article and the end of the web preparatory to their seizure by said grippers, means for feeding the article and the end of the web to said assembling device, a pasting mechanism operated by the movement of said assembling device for applying the paste to the end of the web as the parcel is rotated by said grippers, and means for securing the end of the web in place while such end remains integral with the main web.

46. In a mailing machine, rotatable grippers for winding a jacket about an article to form a parcel, means for reciprocating said grippers in the line of the axis of their rotation, an assembling device movable back and forth crosswise relatively to the axis of rotation of said grippers for associating the article and its jacket preparatory to their seizure by said grippers, means for feeding the article and jacket to said assembling device, and a pasting mechanism operated by the movement of said assembling device for applying the paste to the wrapper as the parcel is rotated by said grippers.

47. In a mailing machine, a web carrying device, a parcel forming mechanism for wrapping the article in a part of the web while such part is integral with the main web, a pasting mechanism for applying paste to the part of the web wrapped about the article while such part remains integral with the main web, and means for securing the wrapped part of the web in place while such part remains integral with the main web.

48. In a mailing machine, a web carrying device, a parcel forming mechanism for wrapping the article in a part of the web while such part is integral with the main web, a pasting mechanism for applying paste to the part of the web wrapped about the article while such part is integral with the main web, means including a severing device for securing the wrapped part of the web in place while such part remains integral with the main web, and mechanism for actuating said severing device to divide the wrapped part of the web from the main web after such wrapped part has been secured in place and the package completed.

49. In a mailing machine, a web carrying device, rotatable grippers for wrapping the article in a part of the web while such part is integral with the main web, a pasting mechanism for applying paste to the wrapper while the latter is integral with the main web and when the parcel is rotated by said grippers, means including a severing device for securing the wrapper in place while it is integral with the main web, and mechanism for actuating said severing device to divide the wrapper from the main part of the web after the application of the paste and after the wrapper has been secured.

50. In a mailing machine, a web carrying device, a parcel forming mechanism for wrapping the article in a part of the web while said part is integral with the main web, a reciprocating assembling device for associating the wrapper end of a web and the article to be wrapped, means for feeding the article to said assembling devices, a pasting mechanism for applying paste to the wrapper while the wrapper is integral with the main web, said wrapper being secured in place while it remains integral with the main web, and a mechanism for severing the wrapper from the main web after the wrapper has been secured.

51. In a mailing machine, a web carrying device, rotatable grippers for holding the article to be wrapped and drawing a part of the web from said carrying device and winding it about the article while such part of the web forms part of the main web, pasting mechanism for applying paste to the web while it is integral with the main web, means including a severing device for securing the wrapped part of the web in place while such part is integral with the main web, and mechanism for actuating said severing device to divide the wrapped part of the web from the main web after the application of paste and after the wrapped part has been secured in place.

52. In a mailing machine, means for supplying paper in the form of a web, an assembling device for associating the wrapper end of a web and the article to be wrapped, means for feeding the article to said assembling device, a parcel forming mechanism for wrapping together the wrapper and the article associated by said assembling device while such wrapper is integral with the main web, pasting mechanism for applying paste to the wrapper, while such wrapper is integral with the main web, said wrapper being secured in place while it is integral with the main web and means for severing the wrapper from the main web after the application of the paste and after the wrapper has been secured in place.

53. In a mailing machine, an assembling device for associating the end of a web and the article to be wrapped, means for supplying the paper in the form of a web and for feeding the article to said assembling device, rotatable grippers for seizing the article and the end of the web associated by said assembling device and winding the web about the article to form a parcel while the part of the web so wound is integral with the main web, a pasting mechanism for applying paste to the wrapper while the latter is integral with the main web, means including a severing device for securing the wrapped part of the web in place while such part is integral with the main web, and mechanism for actuating said severing device to divide the wrapped part of the web from the main web after the application of the paste and after the wrapped part of the web has been secured in place.

54. In a mailing machine, a web carrying device, a parcel forming mechanism for wrapping the article in a part of the web while such part is integral with the main web, a paste reservoir, a transfer-roll, means for moving said transfer-roll to convey paste from said reservoir and to apply it to the wrapper while such wrapper is integral with the main web, and means for securing the wrapper in place while it is integral with the main web.

55. In a mailing machine, a web carrying device, rotatable grippers for wrapping the article in a part of the web while such part is integral with the main web, a paste reservoir, a transfer-roll, mechanism for moving said transfer-roll from said reservoir to contact with the wrapper held by said grippers while the latter are rotated, and means for securing the wrapper in place while it is integral with the main web.

56. In a mailing machine, rotatable grippers for winding a wrapper about an article to form a parcel, an assembling device movable back and forth crosswise relatively to said grippers for associating the article and its wrapper preparatory to their seizure by said grippers, a paste reservoir, a transfer-roll, and mechanism operated by said assembling device for moving said transfer-roll from said reservoir to contact with the wrapper held by said grippers when the latter are rotated.

57. In a mailing machine, a web carrying device, rotatable grippers for wrapping the article in a part of the web while such part is integral with the main web, an assembling device movable back and forth crosswise relatively to said grippers for associating the end of the web and the article preparatory to their seizure by said grippers, a paste reservoir, a transfer-roll, mechanism operated by said assembling device for moving said transfer-roll from said reservoir to contact with the part of the web forming the wrapper, and means for securing the end of the web in place about the parcel while it remains integral with the main web.

58. In a mailing machine, a parcel forming mechanism, an assembling device coacting with said parcel forming mechanism, means for reciprocating said assembling device both horizontally and vertically, a paste reservoir, pivoted bell-cranks, levers pivoted on one of the members of said bell-cranks, a transfer-roll mounted on the free ends of said levers, springs normally depressing the free ends of the levers relatively to the members of the bell-cranks to which said levers are pivoted and moving said bell-cranks to press said transfer-roll toward said reservoir, straps hinged to said assembling device and having a sliding connection with the other members of said bell-cranks to move said transfer-roll against the action of said springs toward said parcel forming mechanism, and adjustable stops for regulating the movement of said levers carrying the transfer-roll toward said parcel forming mechanism.

59. In a mailing machine, rotatable grippers for winding a part of a web about the article to be wrapped to form a parcel while the part so wrapped is integral with the main web, an assembling device for associating the article and the web preparatory to their seizure by said grippers and movable back and forth crosswise relatively to said grippers, and a knife carried by said assembling device for pressing the wrapped part of the web upon the parcel and severing the parcel from the web after the wrapped part of the web has been secured about the parcel.

60. In a mailing machine, rotatable grippers for winding a part of a web about the article to be wrapped to form a parcel while such part is integral with the main web, an assembling device for associating the article and the part of the web to be wrapped preparatory to their seizure by said grippers and movable back and forth crosswise relatively to said grippers, means including a knife having a scalloped and serrated edge for securing the wrapped part of the web about the parcel while such part remains integral with the main web, and means for causing said knife to sever the wrapped part of the web after the completion of the package.

61. In a mailing machine, rotatable grippers for winding a part of a web about the article to be wrapped to form a parcel while the part so wrapped forms part of the main web, means for applying paste to the wrapper for securing the wrapper to the parcel, means for severing the part of the web forming the wrapper from the main web, an adjustable receiving shelf for receiving the parcels from said grippers and means above said shelf for pressing the flap of the wrapper into place.

62. In a mailing machine, rotatable grippers for winding a part of a web about the article to be wrapped to form a parcel while the part so wrapped forms part of the main web, means for applying paste to the parcel for securing the wrapper, means for severing the part of the web forming the wrapper from the main web, a receiving shelf reciprocable relatively to said grippers for receiving the completed parcel, and a brush for pressing the flap of the wrapper into place.

63. In a mailing machine, means for carrying a roll of paper, assembler plates for receiving the web from the roll and associating it with the article to be wrapped, means for intermittently feeding the web and the article to be wrapped to said assembler plates, and a parcel forming mechanism for receiving the web and article associated by said assembler plates.

64. In a mailing machine, means for carrying a roll of paper, guide-plates for receiving the web from the roll, assembler plates movable relatively to said guide-plates for receiving the web from the latter and associating it with the article to be wrapped, a gripping blade carried by said assembler plates for engaging the web when said assembler plates are moved away from said guide-plates and adapted to release the web on the return movement, a friction device on said guide-plates for retarding the movement of the web through the same, means for reciprocating said assembler plates, and a parcel forming mechanism for receiving the web and article associated by said assembler plates.

65. In a mailing machine, means for carrying a roll of paper, guide-plates for receiving the web from the roll, assembler plates for receiving the web from said guide-plates and associating it with the article to be wrapped, means for intermittently feeding the web and article to be wrapped to said assembler plates, and a parcel forming mechanism for receiving the web and article associated by said assembler plates.

66. In a mailing machine, means for carrying a roll of paper, assembler plates for receiving the web from the roll and associating it with the article to be wrapped, means on said assembler plates for engaging the web when said plates are moved to draw the web from the roll and adapted to release the web on the return movement, means for reciprocating said assembler plates, and a parcel forming mechanism for receiving the web and the article associated by said assembler plates.

67. In a mailing machine, a vertically reciprocable support, guide-plates fixed on said support for receiving the web of which the wrappers are formed, assembler plates movable on said support relative to said guide-plates for receiving the web from the latter to associate the web and the article to be wrapped, and a parcel forming mechanism for receiving the associated web and article from said assembler plates.

68. In a mailing machine, means for carrying a roll of paper, a looping mechanism for the paper coming from the roll, guide plates for receiving the web from the looping mechanism, assembler plates movable relatively to said guide plates for receiving the web from the latter and associating the web with the article to be wrapped, means for intermittently feeding the articles to be wrapped to said assembler plates and a parcel forming mechanism for receiving the associated web and article from said assembler plates.

69. In a mailing machine, a parcel forming mechanism, means for carrying a roll of paper, a looping mechanism for the paper coming from the roll, guide-plates for receiving the web from said looping mechanism, assembler plates movable relatively to said guide-plates for receiving the web from the latter and associating the web with the article to be wrapped, means for intermittently feeding the web from said looping mechanism to said assembler plates, means for intermittently feeding the articles to be wrapped to said assembler plates, and a parcel forming mechanism for receiving the associated web and article from said assembler plates.

70. In a mailing machine, means for carrying a roll of paper, a looping mechanism for the paper coming from the roll, guide plates for receiving the web from said looping mechanism, assembler plates movable relatively to said guide plates, for associating the web with the article to be wrapped, means for preventing the withdrawal of the web from the assembler plates by the looping mechanism, means for reciprocating the assembler plates, and a parcel forming mechanism for receiving the associated web and the article from the assembler plates.

71. In a mailing machine, means for carrying a roll of paper, a looping mechanism for the web coming from the roll, a vertically reciprocable support, guide-plates fixed on said support for receiving the web from said looping mechanism, assembler plates movable on said support relatively to said guide-plates for receiving the web from said guide-plates and associating it with the article to be wrapped, a blade on the assembler plates for engaging with the web when said assembler plates are moved away from said guide-plates and adapted to release the web when the assembler plates are moved toward said guide-plates, a tension plate on said guide-plates for retarding the web and for preventing the web from being withdrawn from the assembler plates by the looping mechanism, means for reciprocating said assembler plates, and a parcel forming mechanism for receiving the associated web and article from said assembler plates.

72. In a mailing machine, means for carrying a roll of paper, spring actuated looping mechanism for the web coming from the roll, mechanism for automatically regulating the action of said looping mechanism, and parcel forming mechanism for drawing the web from the roll against the action of said looping mechanism and operating to utilize the strain of the web to shape and to hold the article while the parcel is being formed.

73. In a mailing machine, means for carrying a roll of paper, spring operated looping mechanism for the web coming from the roll, reciprocating assembler plates for associating the web and the article to be wrapped and rotatable grippers for seizing the associated web and article and winding the web about the article against the action of said looping mechanism.

74. In a mailing machine, means for carrying a roll of paper, spring operated looping mechanism for the web coming from the roll, mechanism for automatically regulating the action of said looping mechanism, means for associating the web and the article to be wrapped, and rotatable grippers for seizing the associated web and article and winding the web about the article against the action of said looping mechanism.

75. In a mailing machine, means for carrying a roll of paper, parcel forming mechanism for drawing the web from the roll and wrapping it about the article and operating to utilize the strain of the web to shape and to hold the article while the parcel is being formed, and an addressing device adjustable longitudinally of the path of travel of the web in passing from said means for carrying the roll to said parcel forming mechanism.

76. In a mailing machine, a web carrying device, a parcel forming mechanism for holding the article to be wrapped and drawing a part of the web from said carrying device and wrapping it about the article while the part of the web so wrapped forms part of the main web, and an addressing device for placing the address on the part of the web so wrapped before it reaches the parcel forming mechanism and adjustable longitudinally of the path of travel of the web from said carrying device to said parcel forming mechanism.

77. In a mailing machine, means for carrying a roll of paper, an assembling mechanism for associating the web and the article to be wrapped, an intermittently operated parcel forming mechanism for receiving the associated web and article from said assembling mechanism, a guide-way for stencil plates passing beneath the path of travel of the web from the means for carrying the roll to said assembling mechanism, means for successively moving stencil plates along said guide-way, a lever, means for oscillating said lever during the intermissions in the operation of said parcel forming mechanism, an arm hinged to said lever and having an extension at one end, a friction-box, a rod registering with said friction-box and connected with the extension of said arm, a spring acting on said rod to move it through said resistance box, and an inking roll carried by said arm and adapted to be pressed against the stencil plates in said guide-way.

78. In a mailing machine, means for carrying a roll of paper, an assembling mechanism for associating the web and the article to be wrapped, intermittently operated parcel forming mechanism for receiving the associated web and article from said assembling mechanism, a guide-way for stencil plates, a reservoir for supplying stencil plates mounted on one end of said guide-way, a reservoir for receiving stencil plates mounted on the other end of said guide-way, means for moving the stencil plates from the supplying reservoir along the guide-way to the lower part of the receiving reservoir, a reciprocative follower for elevating the stencil plates in said receiving reservoir, spring pressed jaws coacting with said follower for holding the stencil plates in an elevated position in said receiving reservoir, and means for applying ink to the stencil plates during the intermissions in the operation of said parcel forming mechanism.

79. In a mailing machine, means for carrying a roll of paper, an assembling mechanism for associating the web and the article to be wrapped, an intermittently operated parcel forming mechanism for receiving the associated web and article from said assembling mechanism, and an addressing mechanism adjustable longitudinally of the path of travel of the web intermediate of the means for carrying the roll and the assembling mechanism to apply the address to the web during an intermission in the operation of said parcel forming mechanism.

80. In a mailing machine, means for carrying a roll of paper, an assembling mechanism for associating the web and the article to be wrapped, a parcel forming mechanism, means for intermittently operating said parcel forming mechanism, a guide-way for stencil plates, reservoirs mounted on opposite ends of said guide-way for holding stencil plates, a pawl for moving stencil plates through said guide-way from one reservoir to the other, an inking roll for applying ink to a stencil plate in the guide-way, a lever carrying said pawl and said inking roll, and mechanism for oscillating said lever during the intermissions in the operation of said parcel forming mechanism.

81. In a mailing machine, means for carrying a roll of paper, an assembling mechanism for associating the web and the article to be wrapped, a parcel forming mechanism, means for intermittently operating said parcel forming mechanism, a guide-way for stencil plates, means for intermittently feeding stencil plates along said guide-way, an intermittently operated roll for applying ink to the stencil plates, and an intermittently operated plunger located above the path of travel of the web and above said guide-way and coöperating with said inking roll.

82. In a mailing machine, a parcel forming mechanism for wrapping the article in a part of a web while such part is integral with the main web and said forming mechanism operating to utilize the strain of the web to shape and to hold the article while the parcel is being formed, and means for applying paste to the body part of the parcel before the wrapping is completed.

83. In a mailing machine, a parcel forming mechanism for wrapping the article in part of a web while such part is integral with the main web, means for applying paste to the body part of the parcel before the wrapping is completed, and means for severing the parcel from the main web after the wrapped part of the web has been affixed to the pasted body part of the parcel.

84. In a mailing machine, a rotatable parcel forming mechanism for winding the article in a part of a web while such part is integral with the main web and said forming mechanism operating to utilize the strain of the web to shape and to hold the article while the parcel is being formed, and vibrating mechanism for applying paste to the body of the parcel while the latter is rotated and before the winding of the web is completed and while the wound part of the web remains integral with the main web.

85. In a mailing machine, a rotatable parcel forming mechanism for winding the article in a part of a web while such part is integral with the main web, vibrating mechanism for applying paste to the body of the parcel while the latter is rotated and while the wound part of the web remains integral with the main web, and means for severing the parcel from the web after the wound part of the web has been affixed to the pasted body part of the parcel.

86. In a mailing machine, flat rotatable grippers for winding the article in a part of a web while such part is integral with the main web to form a flat parcel, a paste transfer-roll, and means for oscillating said roll to apply paste to an edge of the body of the parcel while the latter is rotated by said grippers and before the winding of the web is completed and while the wound part of the web remains integral with the main web.

87. In a mailing machine, flat rotatable grippers for winding the article in a part of a web while such part is integral with the main web to form a flat parcel, a paste transfer-roll, means for oscillating said roll to apply paste to an edge of the body part of the parcel while the latter is rotated by said grippers and before the winding of the web is completed and while the wound part of the web remains integral with the main web, a knife, and means for moving said knife to sever the parcel from the main web after the winding has been completed and the wound part of the web has been affixed to the pasted edge of the body part of the parcel.

88. In a mailing machine, a device for carrying a web under tension, a parcel forming mechanism for drawing the web from said carrying device and wrapping the article in a part of the web while the part so drawn and wrapped is integral with the main web and said forming mechanism operating to utilize the strain of the web to shape and to hold the article while the parcel is being formed, and means for applying paste to the body part of the parcel before the wrapping is completed.

89. In a mailing machine, a device for carrying a web under tension, a parcel forming mechanism for drawing the web from said carrying device and wrapping the article in the part of the web so drawn while such part is integral with the main web, means for applying paste to the body part of the parcel before the wrapping is completed, and means for severing the parcel from the main web after the wrapped part of the web has been affixed to the pasted body part of the parcel.

90. In a mailing machine, a device for carrying a web under tension, a rotatable parcel forming mechanism for drawing the web from said carrying device and winding the article in the part of the web so drawn while the part of the web so wound is integral with the main web, and vibrating mechanism for applying paste to the body of the parcel while the latter is rotated and before the winding of the web is completed and while the wound part of the web remains integral with the main web.

91. In a mailing machine, a device for carrying a web under tension, a rotatable parcel forming mechanism for drawing the web from said carrying device and winding the article in the part of the web so drawn while such part is integral with the main web, vibrating mechanism for applying paste to the body of the parcel while the latter is rotated and before the winding of the web is completed and while the wound part of the web remains integral with the main web, and means for severing the parcel from the web after the wound part of the web has been affixed to the pasted body part of the parcel.

92. In a mailing machine, a device for carrying a web under tension, flat rotatable grippers for drawing the web from said carrying device and winding the article in the part of the web so drawn while such part is integral with the main web to form a flat parcel, a paste transfer-roll, and means for oscillating said roll to apply paste to an edge of the body of the parcel while the latter is rotated by said grippers and before the winding of the web is completed and while the wound part of the web remains integral with the main web.

93. In a mailing machine, a device for carrying a web under tension, flat rotatable grippers for drawing the web from said carrying device and winding the article in the part of the web so drawn while such part is integral with the main web to form a flat parcel, a paste transfer-roll, means for oscillating said roll to apply paste to an edge of the body of the parcel while the latter is rotated by said grippers and before the winding of the web is completed and while the wound part of the web remains integral with the main web, and means for severing the parcel from the web after the wound part of the web has been affixed to the pasted edge of the body part of the parcel.

94. In a mailing machine, an assembling device for associating the web and the article to be wrapped, means for supplying paper in the form of a web and feeding the article to said assembling device, a parcel forming mechanism for wrapping together the article and web associated by the assembling device while the part of the web so wrapped is integral with the main web, and means for applying paste to the body part of the parcel before the wrapping is completed.

95. In a mailing machine, an assembling device for associating the web and the article to be wrapped, means for supplying the paper in the form of a web and feeding the article to said assembling device, a parcel forming mechanism for wrapping together the article and web associated by the assembling device while the part of the web so wrapped is integral with the main web, means for applying paste to the body part of the parcel before the wrapping is completed, and means for severing the parcel from the main web after the wrapped part of the web has been affixed to the pasted body part of the parcel.

96. In a mailing machine, an assembling device for associating the web and the article to be wrapped, means for supplying the paper in the form of a web and feeding the article to said assembling device, a rotatable parcel forming mechanism for winding together the article and web associated by said assembling device while the part of the web so wound is integral with the main web, and vibrating mechanism for applying paste to the body of the parcel while the latter is rotated and before the winding of the web is completed and while the wound part of the web remains integral with the main web.

97. In a mailing machine, an assembling device for associating the web and the article to be wrapped, means for supplying the paper in the form of a web and feeding the article to said assembling device, a rotatable parcel forming mechanism for winding together the article and web associated by said assembling device while the part of the web so wound is integral with the main web, vibrating mechanism for applying paste to the body of the parcel while the latter is rotated and before the winding of the web is completed and while the wound part of the web remains integral with the main web, and means for severing the parcel from the main web after the wound part of the web has been affixed to the pasted body part of the parcel.

98. In a mailing machine, an assembling device for associating the web and the article to be wrapped, means for supplying the paper in the form of a web and for feeding the article to said assembling device, flat rotatable grippers for winding together the article and web associated by said assembling device while the part of the web so wound is integral with the main web to form a flat parcel, a paste transfer-roll, and means for oscillating said roll to apply paste to an edge of the body of the parcel while the latter is rotated by said grippers and before the winding of the web is complete.

99. In a mailing machine, an assembling device for associating the web and the article to be wrapped, means for supplying the paper in the form of a web and for feeding the article to said assembling device, flat rotatable grippers for winding together the article and web associated by said assembling device while the part of the web so wound is integral with the main web to form a flat parcel, a paste transfer-roll, means for oscillating said roll to apply paste to an edge of the body of the parcel while the latter is rotated by said grippers and before the winding of the web is complete, a knife, and means for moving said knife to sever the parcel from the main web after the winding has been completed and after the wound part of the web has been affixed to the pasted edge of the body part of the parcel.

100. In a mailing machine, a parcel forming mechanism, an assembling device, and means for reciprocating said assembling device both horizontally and vertically to present the article and its wrapper associated by said assembling device to said parcel forming mechanism.

101. In a mailing machine, rotating grippers for winding a jacket about an article to form a parcel, means for reciprocating said grippers in the line of the axis of their rotation, an assembling device for associating the article and its jacket preparatory to their seizure by said grippers, and means for moving said assembling device back and forth between the ends of said grippers as the latter are separated or brought together.

102. In a mailing machine, rotatable grippers for winding a jacket about an article to form a parcel, means for reciprocating said grippers in the line of the axis of their rotation, a reciprocating assembling device, means for feeding an article to said assembling device on its forward movement, and means for moving said assembling device with relation to said grippers to associate said article and its jacket preparatory to their engagement by said grippers.

103. In a mailing machine, means for carrying a roll of paper, an assembling device constantly carrying the web leading from the roll and operating to associate a part of the web with the article to be wrapped, and a parcel forming mechanism for receiving the article and the web from the assembling device and completing the parcel while the part of the web wrapped about the article remains integral with the main web.

104. In a mailing machine, means for carrying a roll of paper, an assembling device constantly carrying the web leading from the roll and operating to associate the web with the article to be wrapped, a parcel forming mechanism for receiving the article and web from the assembling device, and completing the parcel while the part of the web wrapped about the article remains integral with the main web, and means for severing the parcel from the web carried by the assembling device after the completion of the parcel.

105. In a mailing machine, means for carrying a roll of paper, a parcel forming mechanism for wrapping the article in the end of the web leading from the roll, an assembling device constantly carrying the web leading from the roll and operating to associate the article and the end of the web and reciprocatory relatively to said parcel forming mechanism and said means for carrying the roll and in the path of travel of the web, and means on said assembling device operating to engage the web as the assembling device moves toward the parcel forming mechanism and to release the web as the assembling device moves away from the parcel forming mechanism.

106. In a mailing machine, means for carrying a roll of paper, a parcel forming mechanism for wrapping the article in the end of the web leading from the roll, an assembling device intermediate of the roll carrying means and the parcel forming mechanism constantly carrying the web and operating to associate the article and the end of the web preparatory to their engagement by said parcel forming mechanism, means for moving said assembling device back and forth between the means for carrying the roll and the parcel forming mechanism to present the associated article and web to the parcel forming mechanism, and means on said assembling device for engaging with the web to draw the latter from the roll as the assembling device moves toward the parcel forming mechanism.

107. In a mailing machine, a web carrying device, a rotatable parcel forming mechanism for winding the end of the web about the article to be wrapped while such end is integral with the main web, an assembling device located intermediate of said web carrying device and said parcel forming mechanism and in constant engagement with the web and operating to associate the end of the web and the article preparatory to their engagement by said parcel forming mechanism, means for reciprocating said assembling device both vertically and horizontally, a pasting mechanism operated by the vertical movement of the assembling device to apply paste to the body part of the parcel while the latter is rotated and before the winding of the web is completed, and means operated by the horizontal movement of the assembling device for severing the parcel from the main web after the wound part of the web has been affixed to the pasted body part of the parcel.

108. In a mailing machine, a web carrying device, rotatable grippers for wrapping the article in a part of the web while such part is integral with the main web, an assembling device for associating the end of the web and the article preparatory to their seizure by said grippers, means for reciprocating said assembling device both horizontally and vertically, a paste applying mechanism operated by the vertical movement of said assembling device to apply paste to the body of the parcel before the wrapping of the web about the article is completed, and a mechanism operated by the horizontal movement of the assembling device for severing the parcel from the main web after the wrapping is completed and the wrapped part of the web affixed to the pasted body part.

109. In a mailing machine, means for carrying a roll of paper, a parcel forming mechanism for wrapping the article in an end of the web leading from the roll, guide-plates intermediate of said roll carrying means and said parcel forming mechanism and constantly carrying the web, and assembler plates for receiving the end of the web from the guide-plates and associating it with the article to be wrapped preparatory to their engagement by the parcel forming mechanism.

110. In a mailing machine, means for carrying a roll of paper, a parcel forming mechanism for wrapping the article in an end of the web leading from the roll, guide-plates intermediate of said roll carrying means and said parcel forming mechanism and constantly carrying the web, assembler plates for receiving the end of the web from the guide-plates and associating it with the article to be wrapped preparatory to their engagement by the parcel forming mechanism, and means for reciprocating said assembler plates between said guide-plates and said parcel forming mechanism to present to the latter the associated article and web.

111. In a mailing machine, means for carrying a roll of paper, a parcel forming mechanism for wrapping the article in an end of the web leading from the roll, guide-plates intermediate of said roll carrying means and said parcel forming mechanism and constantly carrying the web, assembler plates for receiving the end of the web from the guide-plates and associating it with the article to be wrapped preparatory to their engagement by the parcel forming mechanism, means for reciprocating said assembler plates between said guide-plates and said parcel forming mechanism, and means on said assembler plates for engaging the web as said plates move from the guide-plates toward the parcel forming mechanism to feed the web forward.

112. In a mailing machine. rotatable grippers for winding a jacket about an article to form a parcel. assembler plates for receiving the jacket and associating it with the article to be wrapped preparatory to their seizure by said grippers, and means for reciprocating said assembler plates endwise relatively to said grippers to present to the latter the associated jacket and article.

113. In a mailing machine, rotatable grippers for winding a jacket about an article to form a parcel, assembler plates for receiving the jacket and associating it with the article to be wrapped preparatory to their seizure by said grippers, means for reciprocating said assembler plates endwise relatively to said grippers to present to the latter the associated jacket and article, means for intermittently feeding the jacket and article to the assembler plates, and guide-plates for directing the jacket to the assembler plates.

114. In a mailing machine, rotatable grippers reciprocatory in the line of the axis of their rotation for winding a jacket about the article to form a parcel, assembler plates for receiving the jacket and associating it with the article preparatory to their seizure by said grippers, and means for reciprocating said assembler plates crosswise relatively to said grippers to present to the latter the associated jacket and article.

115. In a mailing machine, rotatable grippers reciprocatory in the line of the axis of their rotation for winding a jacket about the article to form a parcel, assembler plates for receiving the jacket and associating it with the article preparatory to their seizure by said grippers, means for reciprocating said assembler plates crosswise relatively to said grippers to present to the latter the associated jacket and article, means for intermittently feeding the jacket and article to the assembler plates, and guide-plates for directing the jacket to the assembler plates.

116. In a mailing machine, means for carrying a roll of paper, rotatable grippers for winding the end of the web leading from the roll about the article to be wrapped to form a parcel while the end of the web so wound is integral with the main web, assembler plates for associating the end of the web and the article preparatory to their seizure by said grippers, means for reciprocating said assembler plates crosswise relatively to said grippers to present to the latter the associated article and web, and guide-plates for directing the web from the roll to said assembler plates.

117. In a mailing machine, means for carrying a roll of paper, rotatable grippers for winding the end of the web leading from the roll about the article to be wrapped to form a parcel while the end of the web so wound is integral with the main web, assembler plates for associating the end of the web and the article preparatory to their seizure by said grippers, means for reciprocating said assembler plates crosswise relatively to said grippers to present to the latter the associated article and web, guide-plates for directing the web from the roll to said assembler plates, and means for applying paste to the body of the parcel before the winding of the web about the article is completed and while the wound part of the web remains integral with the main web.

118. In a mailing machine, means for carrying a roll of paper, parcel forming mechanism for wrapping articles of different sizes in the end of the web leading from the roll, assembler plates for associating the article to be wrapped and the end of the web preparatory to their engagement by the parcel forming mechanism, guide-plates for directing the web from the roll to said assembler plates, and an addressing mechanism located intermediate of the roll carrying means and said guide-plates and adjustable longitudinally of the path of travel of the web for placing the address on the wrapped part of the web before it reaches the parcel forming mechanism.

119. In a mailing machine, a web carrying device, and a parcel forming mechanism for wrapping the article in a part of the web drawn from said carrying device and while such part is integral with the main web and said parcel forming mechanism operating to utilize the strain of the web to shape and to hold the article while the parcel is being formed.

120. In a mailing machine, a web carrying device, and a parcel forming mechanism for wrapping articles of different sizes in a part of the web drawn from said carrying device and while such part is integral with the main web and said parcel forming mechanism operating to utilize the strain of the web to shape and to hold the article while the parcel is being formed.

121. In a mailing machine, a web carrying device, and a parcel forming mechanism for folding the article on itself into a package in the end of the web drawn from said carrying device while such end is integral with the main web, and said forming mechanism operating to utilize the strain of the web to fold the article on itself and to hold the article in its folded condition while the parcel is being formed.

122. In a mailing machine, a web carrying device, and a parcel forming mechanism for folding articles of different sizes into packages in the end of the web drawn from said carrying device while such end is integral with the main web, and said forming mechanism operating to utilize the strain of the web to fold an article on itself and to hold it in its folded condition while the parcel is being formed.

123. In a mailing machine, the combination of means for supporting a roll of paper, a reciprocating assembling mechanism for associating the web and the article to be wrapped, rotatable grippers for winding a part of a web about the article to be wrapped to form a parcel, a web severing device, said web severing device being operated by the movement of the assembling mechanism.

124. In a mailing machine, the combination of means for carrying a roll of paper, a reciprocating assembling mechanism for associating the web and the article to be wrapped, rotatable grippers for winding part of a web about the article to be wrapped to form a parcel, a web severing device carried by the said assembling mechanism, said web severing device being operated by the movement of the assembling mechanism.

125. In a mailing machine, the combination of means for carrying a roll of paper, movable assembler plates for associating the web and the article to be wrapped, rotatable grippers for winding a part of a web about the article and a receiving mechanism movable toward and from the grippers for receiving the completed parcel and delivering it from the machine.

126. In a mailing machine, the combination of means for supporting a roll of paper, rotatable grippers for winding a part of the web about the article to be wrapped, assembler plates movable toward and from the grippers for associating the web and the article to be wrapped, and a receiving mechanism mounted on a common support with said assembler plates and movable toward and from the grippers for receiving the completed parcel and delivering it from the machine.

127. In a mailing machine, the combination of means for supporting a roll of paper, rotatable grippers for winding a part of the web about the article to be wrapped, assembler plates movable toward and from the grippers for associating the web and the article to be wrapped, a receiving mechanism mounted on a common support with said assembler plates and movable toward and from the grippers for receiving the completed parcel and delivering it from the machine, and stripping stops coöperating with said grippers, whereby the article is stripped from said grippers and transferred to said receiving mechanism.

In testimony whereof I hereunto affix my signature in the presence of two witnesses.

SINGLETON A. MAXWELL.

Witnesses:
 GRANT BURROUGHS,
 WADE H. MAXWELL.